(12) United States Patent
Morelli et al.

(10) Patent No.: US 8,254,242 B2
(45) Date of Patent: Aug. 28, 2012

(54) SYSTEM AND METHOD FOR INITIAL RANGING IN WIRELESS COMMUNICATION SYSTEMS

(75) Inventors: Michele Morelli, Fornacette (IT); H. Vincent Poor, Princeton, NJ (US); Luca Sanguinetti, Pisa (IT)

(73) Assignee: Princeton University, Princeton, NJ (US)

( * ) Notice: Subject to any disclaimer, the term of this patent is extended or adjusted under 35 U.S.C. 154(b) by 1062 days.

(21) Appl. No.: 12/114,220

(22) Filed: May 2, 2008

(65) Prior Publication Data

US 2009/0274222 A1 Nov. 5, 2009

(51) Int. Cl.
*H04J 11/00* (2006.01)
*H04J 3/06* (2006.01)

(52) U.S. Cl. .......................... 370/203; 370/350

(58) Field of Classification Search .................. 370/350
See application file for complete search history.

(56) References Cited

U.S. PATENT DOCUMENTS

| 6,078,913 | A | * | 6/2000 | Aoki et al. | 1/1 |
|---|---|---|---|---|---|
| 7,515,641 | B2 | * | 4/2009 | Yu et al. | 375/260 |
| 7,714,782 | B2 | * | 5/2010 | Davis et al. | 342/377 |
| 7,778,153 | B2 | * | 8/2010 | Choi et al. | 370/210 |
| 7,801,232 | B2 | * | 9/2010 | Sung | 375/260 |
| 2007/0058524 | A1 | * | 3/2007 | Modlin et al. | 370/208 |
| 2009/0147872 | A1 | * | 6/2009 | Chong et al. | 375/260 |
| 2010/0290360 | A1 | * | 11/2010 | Ge et al. | 370/252 |

* cited by examiner

*Primary Examiner* — Derrick Ferris
*Assistant Examiner* — Saad A Waqas
(74) *Attorney, Agent, or Firm* — McCarter & English, LLP

(57) ABSTRACT

A system and method for initial ranging in wireless communication systems is provided. A plurality of orthogonal frequency division multiplexing (OFDM) blocks are received by an OFDMA base station transceiver from a plurality of remote user devices in wireless communication with the base station. A ranging subchannel is extracted from the OFDM blocks. The number of active codes in the ranging subchannel is determined, active codes are identified, and carrier frequency offsets (CFOs) are estimated for each active code. Timing delays and power levels for each active code are then estimated. The estimated CFOs, timing delays, and power levels are broadcasted by the base station to the remote user devices, so that the user devices can utilize same to adjust transmission parameters to optimize power levels and synchronize communication with the base station.

27 Claims, 13 Drawing Sheets

SYSTEM AND METHOD FOR INITIAL RANGING IN WIRELESS COMMUNICATION SYSTEMS

STATEMENT OF GOVERNMENT INTERESTS

The present invention was made with government support under National Science Foundation Grant Nos. ANI-03-38807 and CNS-06-25637. Accordingly, the Government has certain rights to the present invention.

BACKGROUND OF THE INVENTION

1. Field of the Invention

The present invention relates to wireless communication systems, and more particularly, to a system and method for initial ranging in wireless communication systems.

2. Related Art

In the field of wireless communication technology, recent demands for high data rates have stimulated intense research activity in multicarrier modulation techniques. Particular interest has been directed to orthogonal frequency-division multiple-access (OFDMA) wireless communication systems, which have become part of the Institute of Electrical and Electronics (IEEE) 802.16 family of standards for wireless metropolitan area networks (WMANs). OFDMA systems allow for the transmission of digital information between a base station (BS) and a plurality of remote user devices, such as cellular telephones, wireless handheld computers, etc. OFDMA systems split the available bandwidth into smaller subchannels composed by a set of orthogonal subcarriers, which are assigned to different users to simultaneously communicate with the BS. The user signals are received at the BS as a series of orthogonal frequency division multiplexing (OFDM) blocks, from which information data are extracted by the BS. Unfortunately, OFDMA systems are extremely sensitive to timing errors and carrier frequency offsets (CFOs) that may occur between uplink signals and the local references at the BS. Timing errors give rise to interblock interference (IBI), while inaccurate compensation of the CFOs destroys orthogonality among subcarriers and produces interchannel interference (ICI) as well as multiple access interference (MAI).

In an attempt to alleviate these drawbacks of OFDMA systems, the IEEE 802.16 standards specify a synchronization procedure called Initial Ranging (IR), wherein users that intend to establish a link with the BS adjust their transmission parameters so that uplink signals arrive at the BS synchronously and with approximately the same power level. In its basic form, the IR process develops through the following steps. First, a remote user computes frequency and timing estimates on the basis of a downlink control channel. The estimated parameters are then used in the uplink phase, during which each remote user transmits a randomly chosen code over a ranging time-slot that comprises a specified number of adjacent OFDM blocks. However, as a consequence of the different users' positions within the cell, uplink signals arrive at the BS at different time instants. Furthermore, since the ranging time-slot is randomly selected, several users may collide over a same ranging subchannel. After separating colliding codes and extracting timing and power information, the BS broadcasts a response message indicating the detected codes and giving the necessary instructions for timing and power adjustment.

The main functions of the BS during the ranging process may be classified as multi-user code detection, and multi-user timing and power estimation. In existing IR techniques, a long pseudo-noise (PN) code is transmitted by each RSS over all available ranging subcarriers. Code detection and timing recovery is then accomplished on the basis of suitable correlations computed in either the frequency or time domains. These approaches require huge computational complexity since each correlation must be evaluated for each possible ranging code and hypothesized timing offset. Moreover, separation of users is achieved by exploiting only the correlation properties of the employed code set. In the presence of multipath distortions, however, ranging subcarriers are subject to different attenuations and phase shifts, thereby leading to a loss of the code orthogonality. This gives rise to MAI, which severely degrades the system performance.

Alternative solutions involve replacing the PN ranging codes with a set of modified generalized chirp-like (GCL) sequences and mitigating the effects of channel distortion through differential detection of the ranging signals. Unfortunately, this approach is still plagued by significant MAT and, furthermore, it cannot be applied to interleaved OFDMA systems since ranging subcarriers must be assigned adjacently. Some attempts at reducing the system complexity rely on the decomposition of the multi-parameter estimation problem into a number of successive steps. However, they are only suitable for flat channels and fail in the presence of multipath distortions. Still another approach involves a reduction of the computational burden, but this is achieved at the price of an increased overhead using a dedicated common ranging code.

A common drawback, among others, of existing IR methods is their poor performance in the presence of frequency selective channels. For example, in one existing method a signal design is proposed which is robust to multipath distortions, wherein ranging signals are divided into several groups and each group is transmitted over an exclusive set of subcarriers with a specific timing delay. This approach leads to a significant reduction of MAI as signals of different groups are perfectly separable in either the frequency or time domain. Additionally, in existing approaches, phase rotations induced by residual CFOs between the uplink signals and the BS frequency scale are ignored even though such rotations may become significant over ranging periods spanning several adjacent blocks. In such cases, the received ranging signals are no longer orthogonal and CFO compensation is necessary to avoid a serious degradation of the system performance. Unfortunately, frequency recovery schemes for OFDMA systems are normally derived under the assumption that uplink signals are transmitted over disjoint subcarriers and, as a result, cannot be applied to a scenario where multiple codes share the same subchannel.

Accordingly, what would be desirable, but has not yet been provided, is a system and method for initial ranging in wireless communication systems, which addresses the foregoing shortcomings of existing initial ranging approaches.

SUMMARY OF THE INVENTION

The present invention relates to a system and method for initial ranging in wireless communication systems. OFDM blocks are received by an OFDMA base station transceiver from a plurality of remote user devices. After passing the received signal into a discrete Fourier transform (DFT) unit, ranging subchannels are extracted from the received blocks, and a ranging subchannel is selected for processing. The number of active codes that are present in the selected subchannel is then determined. Once this information is obtained, CFOs are subsequently estimated together with the active codes using a multiple signal classification (MUSIC) algorithm. Timing delays and power levels are then estimated for each active code using maximum likelihood (ML) and least-squares (LS) estimation algorithms. The BS then broadcasts a response message indicating the detected codes and their corresponding instructions for adjusting synchronization parameters and power levels. A reduced complexity algorithm is also provided by the present invention for estimating timing delays and power levels with reduced computational complexity. In another embodiment of the present invention, CFOs, timing errors, and power levels are estimated using an Estimation of Signal Parameters via Rotational Invariance Techniques (EPSRIT) algorithm.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

Figure 1:
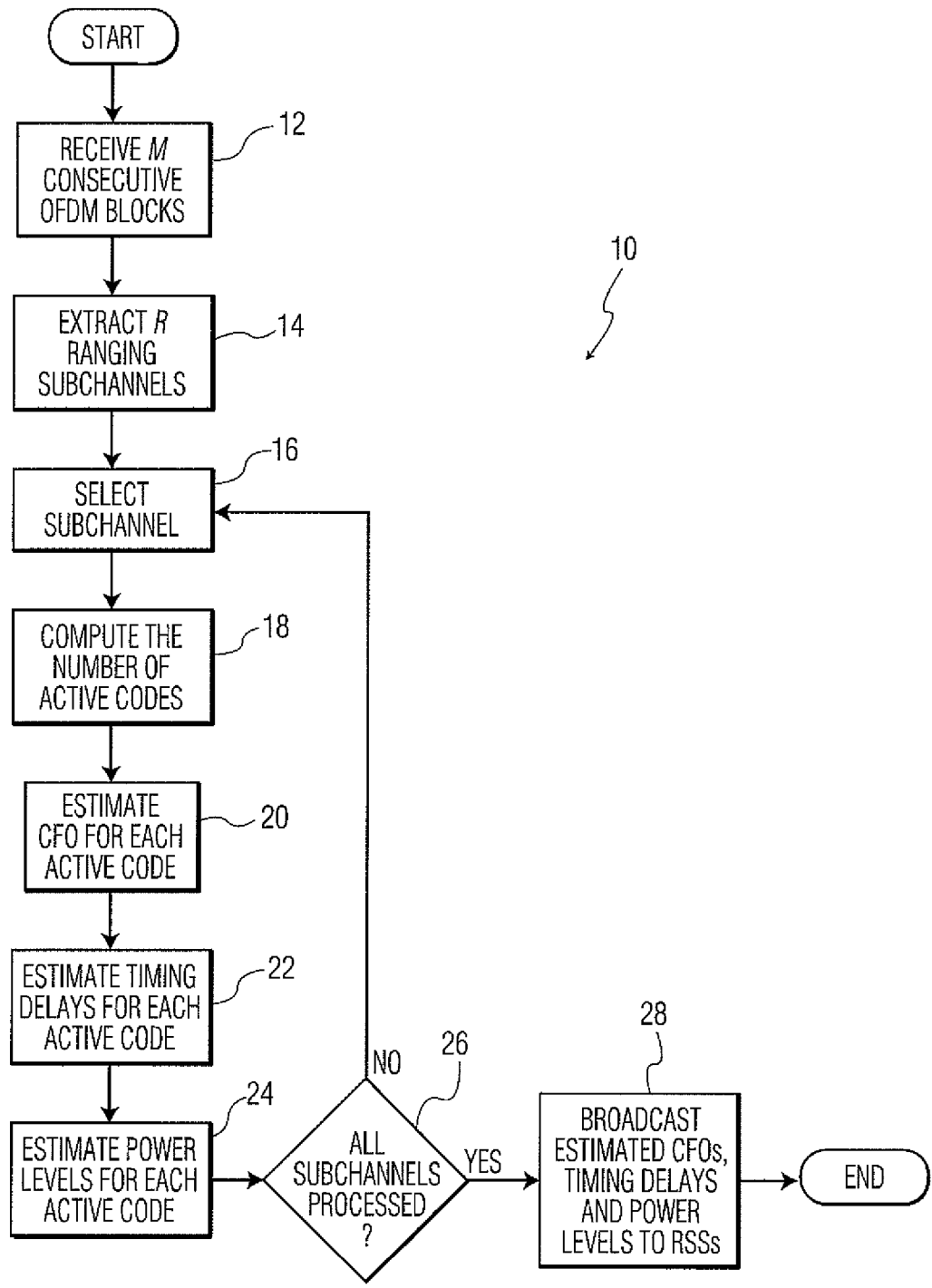
FIG. 1 is a flowchart showing processing steps according to the present invention for initial ranging in a wireless communication system.

The present invention relates to a system and method for initial ranging in wireless communication systems, wherein a specified number of OFDM blocks are received by the BS from a plurality of remote user devices. The received signal is passed to a DFT unit which extracts ranging subchannels from the received blocks, and a ranging subchannel is selected for processing. After determining the number of active codes in the considered subchannel, CFOs are estimated for each active code using a MUSIC algorithm. Timing delays and power levels are then estimated for each active code using ML and LS estimation algorithms. The estimated CFOs, timing delays, and power levels are broadcast by the base station to the remote user devices, which can optimize their power levels and synchronize with the BS reference scales. In another embodiment of the present invention, CFOs, timing errors, and power levels are estimated using an ESPRIT algorithm.

As used herein, matrices and vectors are denoted by boldface letters, with $I_N$ being the identity matrix of order N. The expression $A=\text{diag}\{a(n); n=1, 2, \ldots, N\}$ denotes an N×N diagonal matrix with entries a(n) along its main diagonal, while $B^{-1}$ is the inverse of a square matrix B. The expressions $E\{\cdot\}$, $(\cdot)^*$, $(\cdot)^T$ and $(\cdot)^H$ are used for expectation, complex conjugation, transposition, and Hermitian transposition, respectively. The notation $\|\cdot\|$ represents the Euclidean norm of the enclosed vector, while $|\cdot|$ represents the modulus. The expression $\lfloor c \rfloor$ indicates the largest integer smaller than or equal to c, and $[\cdot]_{k,l}$ denotes the (k,l)th entry of the enclosed matrix.

The present invention is operable with OFDMA wireless communication systems, in which remote wireless communication devices (referred to herein as "ranging subscriber stations" (RSSs)) engage in an IR procedure with an OFDMA BS transceiver (e.g., a transceiver at a cellular tower location, a building, etc.). The equations/algorithms according to the present invention can be utilized in OFDMA systems where M denotes the number of OFDM blocks in a ranging time-slot and each ranging subchannel can be accessed by no more than M−1 RSSs. The latter are separated by means of orthogonal codes which are randomly selected from a set $\{c_1, c_2, \ldots, c_{M-1}\}$, with $c_k[c_k(0),c_k(1), \ldots,c_k(M-1)]^T$ and $|c_k(m)|=1$ for $0 \leq m \leq M-1$. Each OFDM block employs N subcarriers with frequency spacing $\Delta f$ and indices in the set $\{0, 1, \ldots, N-1\}$. R denotes the number of ranging subchannels, each of which is divided into Q subbands uniformly spaced over the signal bandwidth at a distance $(N/Q)\Delta f$ from each other. A given subband is called a tile, and is composed by a set of V adjacent subcarriers. The subcarrier indices in the qth tile (q=0, 1, ..., Q−1) of the rth subchannel (r=0, 1, ..., R−1) are collected into a set $J_q^{(r)}=\{i_{q,v}^{(r)}\}_{v=1}^{V-1}$ with entries $$i_{q,v}^{(r)} = \frac{qN}{Q} + \frac{rN}{QR} + v. \qquad (1)$$

The rth subchannel is thus composed of subcarriers with indices taken from $J^{(r)}=\cup_{q=0}^{Q-1}J_q^{(r)}$, while a total of $N_R=QVR$ ranging subcarriers are available with indices in the set $J_R=\cup_{r=0}^{R-1}J^{(r)}$. The remaining $N-N_R$ subcarriers are used for data transmission and are assigned to data subscriber stations (DSSs), which have successfully completed their IR process and are assumed to be perfectly aligned to the BS time and frequency scales.

FIG. 1 is a flowchart showing processing steps according to the present invention for initial ranging in a wireless communication system (e.g., an OFDMA system), indicated generally at 10. The steps shown in FIG. 1 can be programmed into any suitable OFDMA base station transceiver, and allow such a transceiver to conduct initial ranging processes with RSSs (e.g., cellular telephones, etc.) in accordance with a suitable communication protocol, including, but not limited to, the standard set forth in the Institute of Electrical and Electronics (IEEE) 802.16e standard.

Beginning in step 12, an OFDMA base station transceiver receives M OFDM blocks from a plurality of RSSs that intend to establish a link with the BS. In step 14, each OFDM block is processed by a discrete Fourier transform (DFT) unit to extract the QV subcarriers corresponding to the R ranging subchannels. As a general rule, different RSSs in a given subchannel employ different codes. In step 16, a ranging subchannel is selected and modeled in accordance with the present invention, as follows.

For the purposes of this description, we concentrate on the rth subchannel, where $K^{(r)} \leq M-1$ denotes the number of simultaneously active RSSs. To simplify the notation, the subchannel index $^{(r)}$ is not referred to herein. The waveform transmitted by the kth RSS propagates through a multipath channel of order L with impulse response $h_k=[h_k(0),h_k(1), \ldots,h_k(L-1)]^T$. At the BS, the received samples are not synchronized with the local references. $\theta_k$ denotes the timing error of the signal received from the kth RSS expressed in sampling intervals, while $\epsilon_k$ denotes the corresponding frequency offset normalized to the subcarrier spacing.

We denote by $Y_m$ a QV-dimensional vector which stores the DFT outputs of the considered subchannel during the mth OFDM block. Since DSSs are perfectly aligned to the BS references, their signals do not contribute to $Y_m$. In contrast, the presence of uncompensated CFOs destroys orthogonality among ranging signals and gives rise to ICI. Recalling that the ranging subchannels are interleaved in the frequency domain at a distance of $N\Delta f/(QR)$ from each other, interference on $Y_m$ arising from subchannels other than the considered one can be neglected. Under the above assumptions, it is possible to write:

$$Y_m = \sum_{k=1}^{K} c_k(m) e^{jm\omega_k N_T} A(\omega_k) S_k(\theta_k) + n_m \quad (2)$$

where $\omega_k = 2\pi\epsilon_k/N$ is the angular CFO of the kth RSS, $N_T = N + N_G$ denotes the duration of the cyclically extended blocks and $n_m$ is a Gaussian vector with zero mean and covariance matrix $\sigma^2 I_{QV}$. In addition, the following equation has been defined.

$$A(\omega) = F W(\omega) F^H \quad (3)$$

where $W(\omega)$ is given by:

$$W(\omega) = \text{diag}\{e^{jn\omega}; n = 0, 1, \ldots, N-1\} \quad (4)$$

while $F = [F_0^H F_1^H \ldots F_{Q-1}^H]^H$, with each $F_q$ denoting a V×N matrix with entries:

$$[F_q]_{v,n} = \frac{1}{\sqrt{N}} e^{-j2\pi i_{q,v} n/N} \, 0 \le v \le V-1, 0 \le n \le N-1. \quad (5)$$

Vector $S_k(\theta_k)$ in Equation 2 can be partitioned into Q segments $[S_k^T(\theta_k, i_0) S_k^T(\theta_k, i_1) \ldots S_k^T(\theta_k, i_{Q-1})]^T$ each corresponding to a distinct tile. The qth segment $S_k(\theta_k, i_q)$ has length V and elements given by:

$$S_k(\theta_k, i_{q,v}) = e^{-j\frac{2\pi\theta_k}{N} i_{q,v}} H_k(i_{q,v}), \, 0 \le v \le V-1 \quad (6)$$

where $H_k(\theta_k, i_{q,v})$ is the kth channel frequency response over the $i_{q,v}$th subcarrier, which can be written as:

$$H_k(i_{q,v}) = \sum_{l=0}^{L-1} h_k(l) e^{-j\frac{2\pi l}{N} i_{q,v}}. \quad (7)$$

The above equation indicates that $\theta_k$ appears only as a phase shift across the DFT outputs. The reason for this is that the CP duration is longer than the maximum expected propagation delay, thereby making the ranging signals quasi-synchronous at the BS. The power of the kth RSS over the ranging subcarriers is defined as:

$$P_k = \frac{1}{QV} \sum_{q=0}^{Q-1} \sum_{v=0}^{V-1} |S_k(\theta_k, i_{q,v})|^2. \quad (8)$$

In step 18, the number of currently active codes in the selected subchannel is calculated, as discussed below in greater detail in connection with FIG. 2. Then, in step 20, CFOs are estimated for each active code, as discussed below in greater detail in connection with FIG. 3. In step 22, after CFOs have been estimated, timing delays/errors for each active code are estimated. This process is discussed below in greater detail in connection with FIG. 4. In step 24, power levels for each active code are estimated, as discussed in connection with FIG. 5.

In step 26, a determination is made as to whether all subchannels have been processed. If a negative determination is made, control returns to step 16, so that an additional subchannel can be processed as described above to provide estimates of CFOs, timing delays, and power levels for the corresponding RSSs. If a positive determination is made, step 28 occurs.

After CFOs, timing delays, and power levels have been estimated for each RSS, this information is broadcast in step 28 to the remote users (i.e., the RSSs), so that each user device can adjust its transmission parameters and align its own uplink signal to the BS reference scales. Specifically, users that intend to access the network for the first time compute initial frequency and timing estimates on the basis of a downlink control signal broadcast by the BS. The estimated parameters are then employed by each RSS as synchronization references for the uplink ranging transmission. This means that, during the IR process, the CFOs are induced only by Doppler shifts and/or estimation errors and, as a consequence, they will be quite small. For example, consider the IEEE 802.16 standard for WMANs with subcarrier spacing $\Delta f = 11.16$ kHz and carrier frequency $f_0 = 5$ GHz. In the case of perfect downlink synchronization, the maximum CFO in the uplink is $2f_0 v_k/c$, where $v_k$ denotes the terminal speed while $c = 3 \times 10^8$ m/s is the speed of light. Letting $v_k = 120$ km/h yields $\epsilon_k \le 0.10$, which means that the normalized CFO lies within 10% of the subcarrier spacing. Timing errors depend on the distances of the RSSs from the BS and their maximum value $\theta_{max}$ corresponds to the round trip propagation delay for a user located at the cell boundary. This parameter is known and is given by $\theta_{max} = 2R/(cT_s)$, where R is the cell radius and $T_s = 1/(N\Delta f)$ is the sampling period. A simple way to counteract the effects of timing errors relies on the use of sufficiently long CPs comprising $N_G \ge \theta_{max} + L$ sampling intervals. This leads to a quasi-synchronous network in which timing errors do not produce any IBI and result only in phase shifts at the output of the receive DFT unit. The CP of data blocks should be made just greater than the channel length to minimize unnecessary overhead. It follows that accurate timing estimation must be accomplished during the ranging period in order to align all active users with the BS time-slot and to avoid IBI over the data section of the frame.

Figure 2:
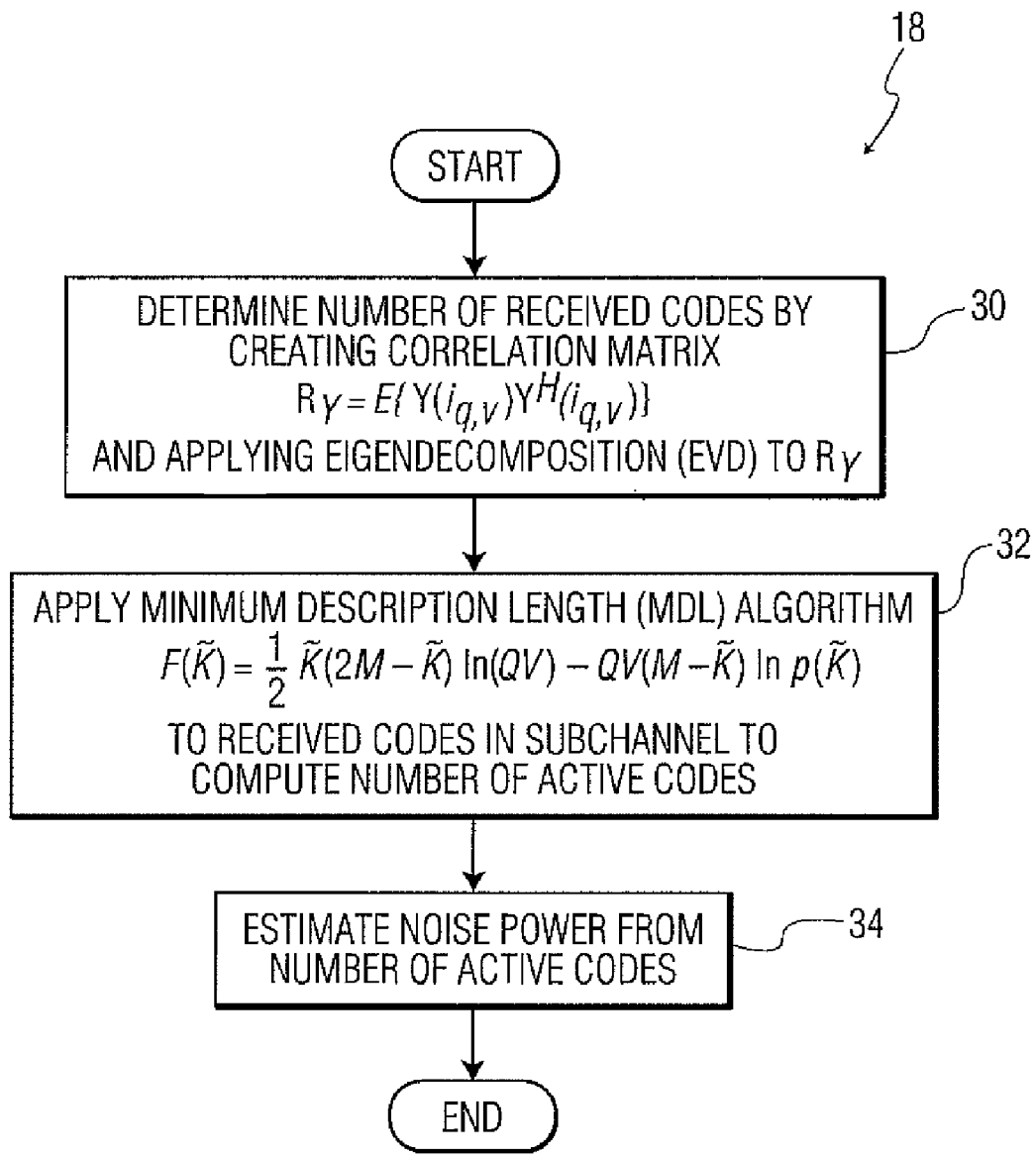
FIGS. 2-5 are flowcharts showing, respectively, processing steps 18-24 of FIG. 1 in greater detail.

FIG. 2 is a flowchart showing step 18 of FIG. 1 in greater detail. As mentioned above, step 18 of FIG. 1 allows for the calculation of the number of active codes in the considered (modeled) ranging subchannel. This information is utilized to derive CFO estimates, as well as estimates of timing delays and power levels of the corresponding active codes.

In step 30, the number of received codes in the considered subchannel is determined by evaluating the correlation matrix and applying an eigendecomposition (EVD) procedure. It is assumed that the CFOs are confined within a small fraction of the subcarrier spacing. In such a case, the demodulated signals incur negligible phase rotations over one OFDM block, and $W(\omega)$ in Equation 4 above can be approximated by $I_N$.

Substituting Equation 3 into Equation 2, and observing that $FF^H = I_{QV}$, yields:

$$Y_m \approx \sum_{k=J}^{K} c_k(m) e^{jm\omega_k N_T} S_k(\theta_k) + n_m \qquad (9)$$

from which it follows that each CFO results only in a phase shift between contiguous OFDM blocks. The DFT output over the $i_{q,v}$th subcarrier of the mth block is thus given by:

$$Y_m(i_{q,v}) \approx \sum_{k=1}^{K} c_k(m) e^{jm\omega_k N_T} S_k(\theta_k, i_{q,v}) + n_m(i_{q,v}) \qquad (10)$$

The vector $Y(i_{q,v}) = [Y_0(i_{q,v}), Y_1(i_{q,v}), \ldots, Y_{M-1}(i_{q,v})]^T$ is then defined for collecting the $i_{q,v}$th DFT output across all M ranging blocks. Then, from Equation 10, it follows that:

$$Y(i_{q,v}) = \sum_{k=1}^{K} S_k(\theta_k, i_{q,v}) \Gamma(\omega_k) c_k + n(i_{q,v}) \qquad (11)$$

where $\Gamma(\omega_k) = \text{diag}\{e^{jm\omega_k N_T}; m=0,1,\ldots,M-1\}$ while $n(i_{q,v}) = [n_0(i_{q,v}), n_1(i_{q,v}), \ldots, n_{M-1}(i_{q,v})]^T$ is Gaussian distributed with zero-mean and covariance matrix $\sigma^2 I_M$.

From Equation 11, it is seen that $Y(i_{q,v})$ is a superposition of frequency-rotated codes $\{\Gamma(\omega_k) c_k\}_{k=1}^{K}$ embedded in white Gaussian noise and with random amplitudes $\{S_k(\theta_k, i_{q,v})\}_{k=1}^{K}$. This model has the same structure as measurements of multiple uncorrelated sources from an array of sensors. EVD can then be performed on the correlation matrix of $Y(i_{q,v})$, whereupon the active codes and their corresponding CFOs can subsequently be determined.

Estimation of the number of active codes over the ranging subchannel can be accomplished in step 30 through the EVD of the correlation matrix $R_Y = E\{Y(i_{q,v}) Y^H(i_{q,v})\}$. Let $\lambda_1 \geq \lambda_2 \geq \ldots \geq \lambda_M$ be the eigenvalues of $R_Y$ arranged in non-increasing order. Then, from Equation 11, it follows that the M−K smallest eigenvalues are equal to the noise power $\sigma^2$ while the largest K eigenvalues are related to $\sigma^2$ and also to the average signal power. Mathematically, the following Equation applies:

$$\lambda_k = \begin{cases} \overline{P}_k + \sigma^2 & \text{for } 1 \leq k \leq K \\ \sigma^2 & \text{for } K+1 \leq k \leq M \end{cases} \qquad (12)$$

where $\overline{P}_k$ are strictly positive quantities related to the signal power. If the quantities $\overline{P}_k$ are much greater than $\sigma^2$, estimating K is not problematic since the eigenvalues exhibit a clear drop in passing from k=K to k=K+1. In practice, however, the drop cannot be easily detected since users starting a ranging procedure are required to keep the transmission power at a relatively low level in order to limit interference to DSSs. A further difficulty is that $R_Y$ is not available at the receiver and must be replaced with some suitable estimate. One approach to solve these difficulties is to use the sample correlation matrix:

$$\tilde{R}_Y = \frac{1}{QV} \sum_{q=0}^{Q-1} \sum_{v=0}^{V-1} Y(i_{q,v}) Y^H(i_{q,v}) \qquad (13)$$

which provides an unbiased and consistent estimate of $R_Y$. An alternative solution is based on the forward-backward (FB) principle. In such a case $R_Y$ is replaced by:

$$\hat{R}_Y = \frac{1}{2}(\tilde{R}_Y + J \tilde{R}_Y^T J) \qquad (14)$$

where $\tilde{R}_Y$ is still given in Equation 13 while J is the exchange matrix with 1's on the anti-diagonal and 0's elsewhere.

In step 32, after performing EVD on $\hat{R}_Y$ and arranging the eigenvalues $\hat{\lambda}_1 \geq \hat{\lambda}_2 \geq \ldots \hat{\lambda}_M$ in non-increasing order, an estimate $\hat{K}$ of the number of active codes is found through information-theoretic criteria. Two examples of such criteria are represented by the Akaike and Minimum Description Length (MDL) criteria. The MDL approach looks for the minimum of the following objective function:

$$F(\tilde{K}) = \frac{1}{2} \tilde{K}(2M - \tilde{K}) \ln(QV) - QV(M - \tilde{K}) \ln \rho(\tilde{K}) \qquad (15)$$

where $\rho(\tilde{K})$ is the ratio between the geometric and arithmetic mean of $\{\hat{\lambda}_{\tilde{K}+1}, \hat{\lambda}_{\tilde{K}+2}, \ldots, \hat{\lambda}_M\}$, i.e., $$\rho(\tilde{K}) = \frac{\left( \prod_{i=\tilde{K}+1}^{M} \hat{\lambda}_i \right)^{\frac{1}{M-\tilde{K}}}}{\frac{1}{M-\tilde{K}} \sum_{i=\tilde{K}+1}^{M} \hat{\lambda}_i} \qquad (16)$$

and $\tilde{K}$ denotes a tentative value of K and varies from 1 to M−1.

In step 34, once $\hat{K}$ has been computed, from Equation 12 an estimate of the noise power $\sigma^2$ can be computed as:

$$\hat{\sigma}^2 = \frac{1}{M - \hat{K}} \sum_{i=\hat{K}+1}^{M} \hat{\lambda}_i. \qquad (17)$$

Figure 3:
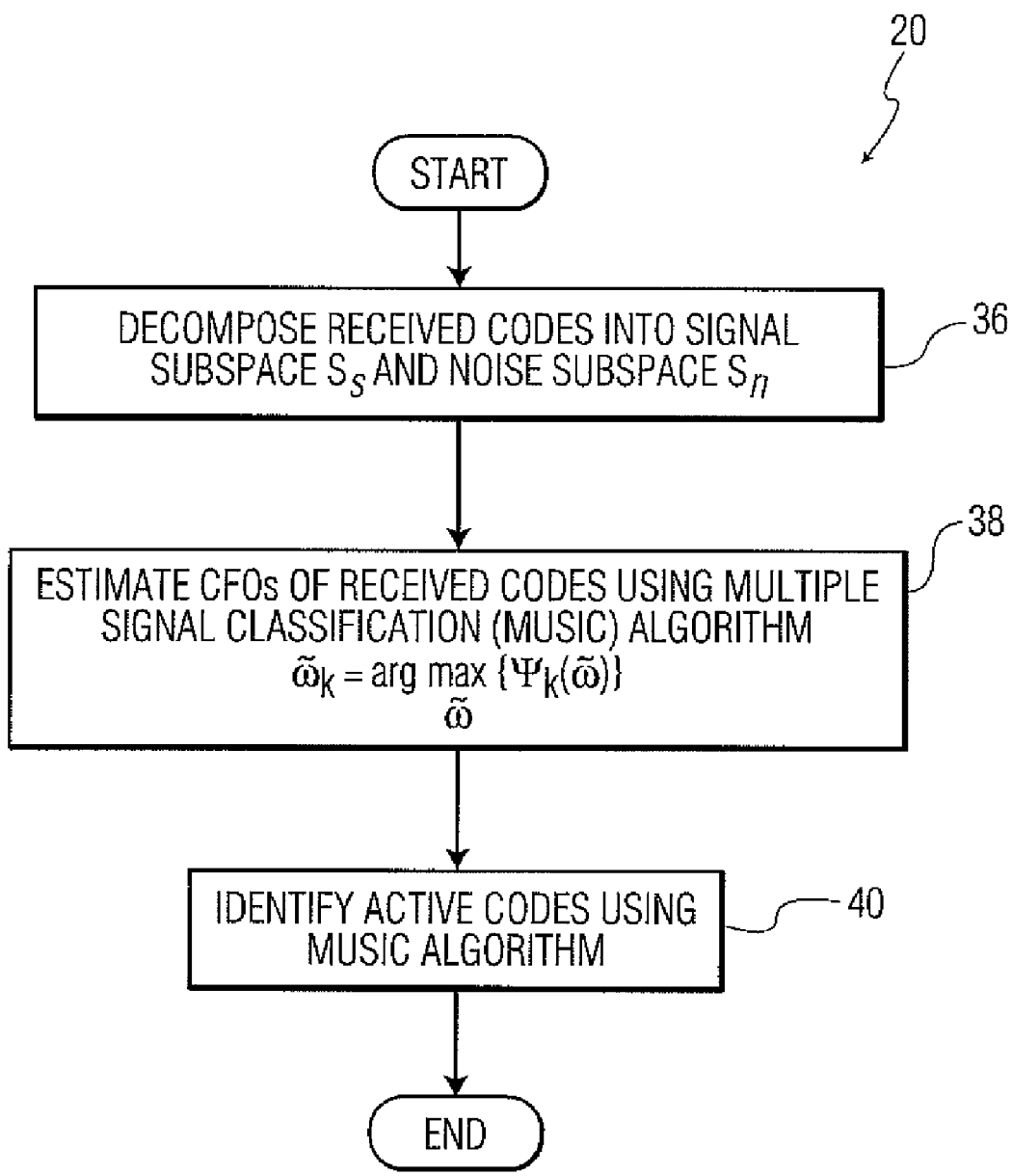

FIG. 3 is a flowchart showing processing step 20 of FIG. 1 in greater detail. Processing step 20 allows for the estimation of CFOs for a given subchannel, as well as the identification of active codes in the subchannel. Beginning in step 36, the observation space is decomposed into a signal subspace $S_\sigma$ which is spanned by the rotated codes $\{\Gamma(\omega_k) c_k\}_{k=1}^{K}$ plus a noise subspace $S_v$. As is known, $S_v$ is the orthogonal complement of $S_\sigma$ so that each vector of $S_\sigma$ is orthogonal to any other vector in $S_v$. To proceed further, it is assumed that the number of active codes has been correctly estimated (i.e., $\hat{K} \approx K$), and $\{\hat{u}_1, \hat{u}_2, \ldots, \hat{u}_M\}$ denotes the eigenvectors of $\hat{R}_Y$ corresponding to the ordered eigenvalues $\hat{\lambda}_1 \geq \hat{\lambda}_2 \geq \ldots \geq \hat{\lambda}_M$.

In step 38, CFOs are estimated using a MUSIC approach The MUSIC algorithm relies on the fact that the eigenvectors $\{\hat{u}_{K+1}, \hat{u}_{K+2}, \ldots, \hat{u}_M\}$ associated with the M−K smallest eigenvalues of $\hat{R}_Y$ form an estimated basis of the noise subspace $S_v$ and, accordingly, they are approximately orthogonal to all vectors in the signal space $S_\sigma$. An estimate of $\omega_k$ is thus obtained by minimizing the projection of $\Gamma(\tilde{\omega})c_k$ onto the subspace spanned by the columns of $\hat{U}_n = [\hat{u}_{K+1}\hat{u}_{K+2} \ldots \hat{u}_M]$. This leads to the following estimation algorithm:

$$\hat{\omega}_k = \underset{\tilde{\omega}}{\arg\max}\{\Psi_k(\tilde{\omega})\} \quad (18)$$

with:

$$\Psi_k(\tilde{\omega}) = \frac{1}{\left\|\hat{U}_n^H \Gamma(\tilde{\omega})c_k\right\|^2} \quad (19)$$

In principle, CFO recovery must only be accomplished for the active codes. However, since at this stage the BS has no knowledge of which codes have been transmitted over the considered subchannel, frequency estimates $\{\hat{\omega}_1, \hat{\omega}_2, \ldots, \hat{\omega}_{M-1}\}$ must be evaluated for the complete set $\{c_1, c_2, \ldots, c_{M-1}\}$.

In step 40, active codes are identified. The present invention searches for the K largest values in the set $\{\Psi_k(\hat{\omega}_k)\}_{k=1}^{M-1}$, say $\{\Psi_{u_k}(\hat{\omega}_{u_k})\}_{k=1}^{K}$, and declares as active the corresponding codes $\{c_{u_k}\}_{k=1}^{K}$. The CFO estimates are eventually found as $\hat{\omega}_u = [\hat{\omega}_{u_1}, \hat{\omega}_{u_2}, \ldots, \hat{\omega}_{u_K}]^T$. The CFO estimation based on the MUSIC algorithm is referred to herein as the MUSIC-based frequency estimator (MFE), while the active code identification algorithm is referred to herein as the MUSIC-based code detector (MCD).

A key issue is the maximum CFO value that can be handled by MFE. To simplify the analysis, it is assumed that the ranging codes belong to the Fourier basis of order M and are given by:

$$c_k(m) = e^{j2\pi mk/M}, 0 \leq m \leq M-1 \quad (20)$$

for $k = 1, 2, \ldots, M-1$. Then, identifiability of the rotated codes $\{\Gamma(\omega_k)c_k\}_{k=1}^{K}$ is guaranteed as long as the CFOs are smaller than $N/(2MN_T)$ in magnitude. Let $\epsilon_k = N/(2MN_T)$ and $\epsilon_{k+1} = -N/(2MN_T)$. In such a case, the received codes $\Gamma(\omega_k)c_k$ and $\Gamma(\omega_{k+1})c_{k+1}$ are identical and there is no way to distinguish among them. This fact limits the acquisition range of MFE to the interval $|\epsilon_k| < N/(2MN_T)$. Although this result has been derived for the Fourier basis specified in Equation 20, it may also apply to other code designs.

The computational load (complexity) of MFE can be assessed as follows. Assume that the number of active codes has already been found and is available at the BS. Then, computing $\hat{R}_Y$ in Equation 14 requires approximately $O(M^2QV)$ operations, while the complexity for evaluating the metric $\Psi_k(\tilde{\omega})$ in Equation 19 is $O(M^2(M-K))$ for each $\tilde{\omega}$. Denoting by $N_\omega$ the number of candidate values $\tilde{\omega}$ and observing that the maximization in Equation 18 must be performed over the entire code set $\{c_1, c_2, \ldots, c_{M-1}\}$, it follows that a total of $O(N_\omega M^2(M-K))$ operations are required to find $\hat{\omega}_u$. The overall complexity of MFE is thus on the order of $O(M^2QV + N_\omega M^2(M-K))$. This figure does not consider the EVD on $\hat{R}_Y$ since this operation is comparatively easier than the maximization step in Equation 18.

Figure 4:
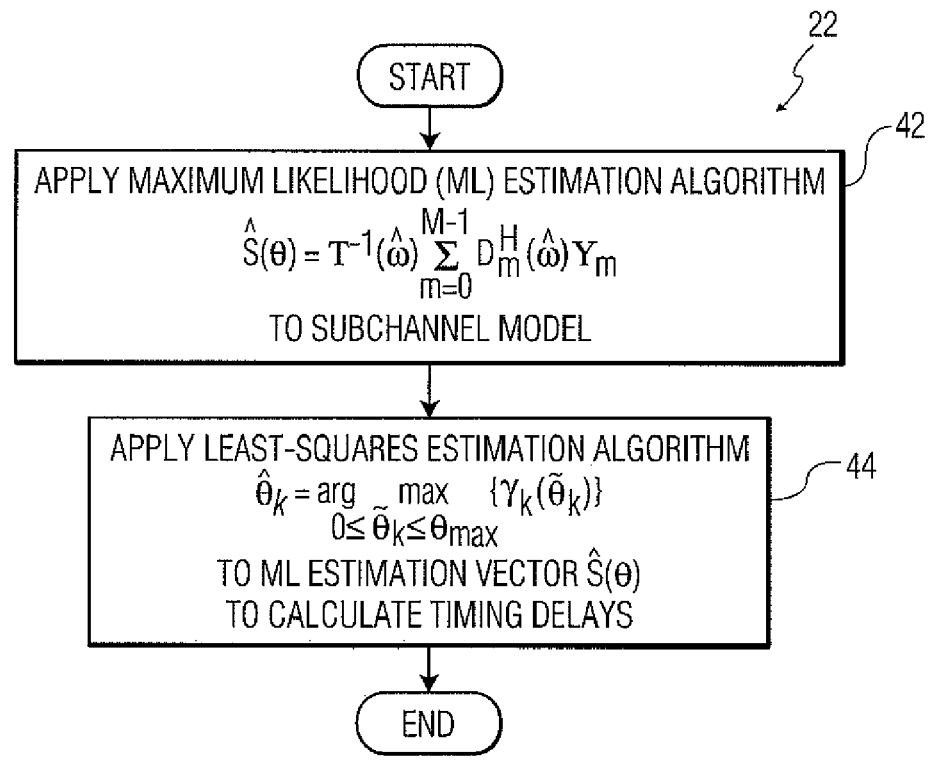

FIG. 4 is a flowchart showing step 22 of FIG. 1 in greater detail. Step 22 allows for the estimation of timing delays of all active RSSs. After code detection and CFO recovery, the BS must acquire information about the timing delays and power levels of all ranging signals. Timing delay estimation is achieved in steps 42 and 44 through the use of ML and LS estimation algorithms. An initial assumption is made that $\hat{K} = K$. To simplify the notation, the indices $\{u_k\}_{k=1}^{K}$ of the detected codes are relabeled according to the map $u_k \rightarrow k$.

First, Equation 2 is reformulated in a more compact form. For this purpose, matrices $D_m(\omega_k) = c_k(m)e^{jm\omega_k N_T}A(\omega_k)$ are defined and collect the CFOs and timing errors in two K-dimensional vectors $\omega = [\omega_1, \omega_2, \ldots, \omega_K]^T$ and $\theta = [\theta_1, \theta_2, \ldots, \theta_K]^T$. Then, $Y_m$ is rewritten as:

$$Y_m = D_m(\omega)S(\theta) + n_m \quad (21)$$

with $S(\theta) = [S_1^T(\theta_1)S_2^T(\theta_2) \ldots S_K^T(\theta_K)]^T$ and $D_m(\omega) = [D_m(\omega_1)D_m(\omega_2) \ldots D_m(\omega_2)]$. Timing recovery is then accomplished by means of a two step procedure in which an estimate of $S(\theta)$ is computed first and then is exploited to obtain the timing errors.

In step 42, it is assumed that the accuracy of the CFO estimates obtained in the first stage of the ranging process is such that $\hat{\omega} = \omega$. Then, from Equation 21, the ML estimate of $S(\theta)$ based on the observed vectors $\{Y_m\}_{m=0}^{m-1}$ is found to be:

$$\hat{S}(\theta) = T^{-1}(\hat{\omega})\sum_{m=0}^{M-1} D_m^H(\hat{\omega})Y_m \quad (22)$$

where $T(\hat{\omega})$ is the following matrix:

$$T(\hat{\omega}) = \sum_{m=0}^{M-1} D_m^H(\hat{\omega})D_m(\hat{\omega}). \quad (23)$$

Substituting Equation 21 into Equation 22 yields:

$$\hat{S}(\theta) = S(\theta) + T^{-1}(\hat{\omega})\sum_{m=0}^{M-1} D_m^H(\hat{\omega})n_m \quad (24)$$

from which it follows that $\hat{S}(\theta)$ is an unbiased estimate of $S(\theta)$ and can be similarly partitioned as $[\hat{S}_1(\theta_1)\hat{S}_2(\theta_2)\ldots\hat{S}_K(\theta_K)]^T$. The kth subvector $\hat{S}_k(\theta_k)$ is composed of Q segments $\{\hat{S}_k(\theta_k, i_q)\}_{q=0}^{Q-1}$ each corresponding to a specific tile in the considered ranging subchannel. From Equation 24, it can be seen that the vth entry of $\hat{S}_k(\theta_k, i_q)$, say $\hat{S}_k(\theta_k, i_{q,v})$, is an unbiased estimate of the quantity $S_k(\theta_k, i_{q,v})$ defined in Equation 6. Hence, from Equations 6 and 7 it follows that:

$$\hat{S}_k(i_{q,v}) = e^{-j\frac{2\pi\theta_k}{N}i_{q,v}}\sum_{l=0}^{L-1} h_k(l)e^{-j\frac{2\pi n}{N}i_{q,v}} + \xi_k(i_{q,v}) \quad (25)$$

where $\xi_k(i_{q,v})$ is a zero-mean disturbance term. The quantities $\{\hat{S}_k(\theta_k, i_{q,v})\}_{q=0}^{Q-1}$ are collected into a Q-dimensional vector $\hat{S}_k(\theta_k, v)$ and $\Phi(\theta_k, v) = \text{diag}\{e^{-j2\pi\theta_k i_{q,v}/N}; 0 \leq q \leq Q-1\}$ is defined. Then, omitting for simplicity the functional dependence of $\hat{S}_k(\theta_k, v)$ on $\theta_k$, from Equation 25 it follows that $$\hat{S}_k(v) = \Phi(\theta_k, v)F(v)h_k + \xi_k(v) \quad (26)$$

where $\xi_k(v) = [\xi_k(i_{0,v}), \xi_k(i_{1,v}), \ldots, \xi_k(i_{Q-1,v})]^T$ while $F(v)$ is a matrix of dimensions Q×L with entries:

$$[F(v)]_{q,l} = e^{-j\frac{2\pi}{N}l i_{q,v}}, 0 \leq q \leq Q-1 \text{ and } 0 \leq l \leq L-1. \quad (27)$$

Equation 26 indicates that, apart from the disturbance vector $\xi_k(v)$, $\hat{S}_k(v)$ is only contributed by the kth RSS, meaning that ranging signals have been successfully decoupled at the BS. Vectors $\{\hat{S}_k(v); v=0, 1, \ldots, V-1\}$ can thus be used to obtain LS estimates of $(\theta_k, h_k)$ individually for each RSS. This amounts to looking for the minimum of the following objective function:

$$\Lambda_k(\tilde{\theta}_k, \tilde{h}_k) = \sum_{v=0}^{V-1} \left\| \hat{S}_k(v) - \Phi(\tilde{\theta}_k, v) F(v) \tilde{h}_k \right\|^2 \tag{28}$$

with respect to $\tilde{\theta}_k$ and $\tilde{h}_k$. For a given $\tilde{\theta}_k$, the minimum occurs at;

$$\tilde{h}_k = \frac{1}{QV} \sum_{v=0}^{V-1} F^H(v) \Phi^H(\tilde{\theta}_k, v) \hat{S}_k(v) \tag{29}$$

where the identity $F^H(v)F(v) = Q \cdot I_L$ has been used, which holds true as long as $L \leq Q$. Then, substituting Equation 29 into Equation 28 and minimizing with respect to $\tilde{\theta}_k$, yields the timing estimate used in step 44, in the form:

$$\hat{\theta}_k = \underset{0 \leq \tilde{\theta}_k \leq \theta_{\max}}{\operatorname{argmax}} \{\Upsilon_k(\tilde{\theta}_k)\} \tag{30}$$

where $\Upsilon_k(\tilde{\theta}_k)$ is given by:

$$\Upsilon_k(\tilde{\theta}_k) = \left\| \sum_{v=0}^{V-1} F^H(v) \Phi^H(\tilde{\theta}_k, v) \hat{S}_k(v) \right\|^2. \tag{31}$$

The timing metric can be rewritten as:

$$\Upsilon_k(\tilde{\theta}_k) = \sum_{l=\tilde{\theta}_k}^{\tilde{\theta}_k+L-1} \left| \sum_{v=0}^{V-1} \hat{s}_k(v, l) e^{j\frac{2\pi l}{N}v} \right|^2 \tag{32}$$

where $\hat{s}_k(v,l)$ is the Q-point inverse DFT (IDFT) of the sequence $\{\hat{S}_k(i_{q,v})\}_{q=0}^{Q-1}$, i.e., $$\hat{s}_k(v, l) = \sum_{q=0}^{Q-1} \hat{S}_k(i_{q,v}) e^{j\frac{2\pi l}{Q}q}. \tag{33}$$

The algorithm of Equation 30 is referred to herein as the LS-based timing estimator (LS-TE). Note that for V=1 the timing metric reduces to:

$$\Upsilon_k(\tilde{\theta}_k) = \sum_{l=\tilde{\theta}_k}^{\tilde{\theta}_k+L-1} |\hat{s}_k(0, l)|^2 \tag{34}$$

and becomes periodic in $\tilde{\theta}_k$ with period Q. In such a case, the estimate $\tilde{\theta}_k$ is affected by an ambiguity of multiples of Q. This ambiguity does not represent a serious problem as long as Q can be chosen greater than $\theta_{max}$. Unfortunately, in some applications this may not be the case. To avoid such an impairment, each tile must be composed by V>1 adjacent subcarriers.

Figure 5:
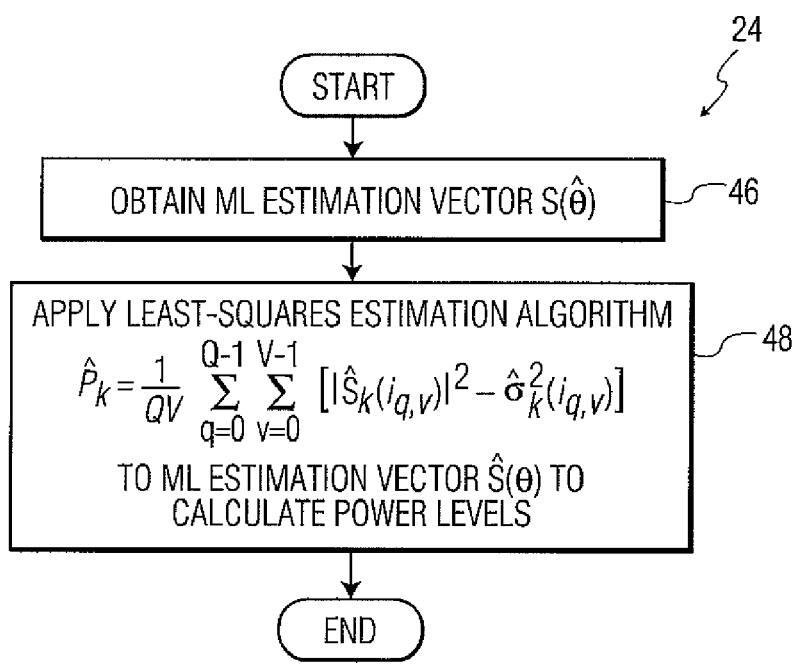

FIG. 5 is a flowchart showing step 24 of FIG. 1 in greater detail. Step 24 aims at estimating the power levels of signals transmitted by the RSSs. In step 46, the ML estimation vector produced in step 42 and shown in Equation 24 is utilized, and power level estimation is accomplished on the basis of Equation 8 above. It is observed from Equation 24 that the entry $\hat{S}_k(i_{q,v})$ is an unbiased estimate of $S_k(i_{q,v})$ with variance:

$$\sigma_k^2(i_{q,v}) = \sigma^2 [T^{-1}(\hat{\omega})]_{\mu_k(q,v), \mu_k(q,v)} \tag{35}$$

where $\mu_k(q,v) = (k-1)QV + qV + v + 1$. An unbiased estimate of $|S_k(i_{q,v})|^2$ is thus given by $|\hat{S}_k(i_{q,v})|^2 - \sigma_k^2(i_{q,v})$. This fact, together with Equations 8 and 35, leads to the following LS-based power estimation algorithm (referred to herein as "LS-PE") utilized in step 48 to calculate the power levels:

$$\hat{P}_k = \frac{1}{QV} \sum_{q=0}^{Q-1} \sum_{v=0}^{V-1} \left[ \left|\hat{S}_k(i_{q,v})\right|^2 - \hat{\sigma}_k^2(i_{q,v}) \right] \tag{36}$$

where $\hat{\sigma}_k^2(i_{q,v}) = \hat{\sigma}^2 [T^{-1}(\hat{\omega})]_{\mu_k(q,v), \mu_k(q,v)}$ and $\hat{\sigma}^2$ is given in Equation 17.

To assess the computational load (complexity) of LS-TE, it is useful to distinguish between a first stage, leading to the sequences $\{\hat{s}_k(v,l)\}_{l=0}^{Q-1}$ in Equation 33, for $0 \leq v \leq V-1$, and a second stage where these sequences are used to compute the timing metrics of the detected codes. First, it is observed that a complexity of order $O(KN \log_2(N))$ is required to determine the matrices $D_m(\hat{\omega}_k)$ for k=1, 2, . . . , K, while computing the matrix $T(\hat{\omega})$ and vector $$\sum_{m=0}^{M-1} D_m^H(\hat{\omega}) Y_m$$

requires $O(MK^2Q^3V^3)$ and $O(MKQ^2V^2)$ operations, respectively. Evaluation of $\hat{S}(\theta)$ through Equation 22 is equivalent to solving a linear system of order KQV and needs $O(K^2Q^2V^2)$ operations. Finally, the complexity of the IDFT in Equation 33 is $O(Q \log_2(Q))$ for each value of v. Since most of the processing is devoted to the computation of $T(\hat{\omega})$, the overall complexity in the first stage can reasonably be approximated as $O(MK^2Q^3V^3)$. In the second stage of the estimation process, the timing metric of Equation 32 is computed for all candidate values $\tilde{\theta}_k$ and all detected codes. Observing that $O(VL)$ operations are required for each quantity $\Upsilon_k(\tilde{\theta}_k)$, the computational burden of the second stage is $O(KVL\theta_{max})$. The overall complexity of LS-TE is summarized in the first row of Table 1 below. Reduced complexity timing delay estimates ("RC-TE") are provided for comparison purposes. RC-TE is described below in connection with FIG. 6.

TABLE 1

| Algorithm | First stage | Second stage |
| --- | --- | --- |
| LS-TE | $O(MK^2Q^3V^3)$ | $O(KVL\theta_{max})$ |
| RC-TE | $O(KQV(M + K))$ | $O(KVL(Q + PV))$ |
| RC-TE (V = 2) | $O(2KQ(M + K))$ | $O(2LKQ)$ |

Figure 6:
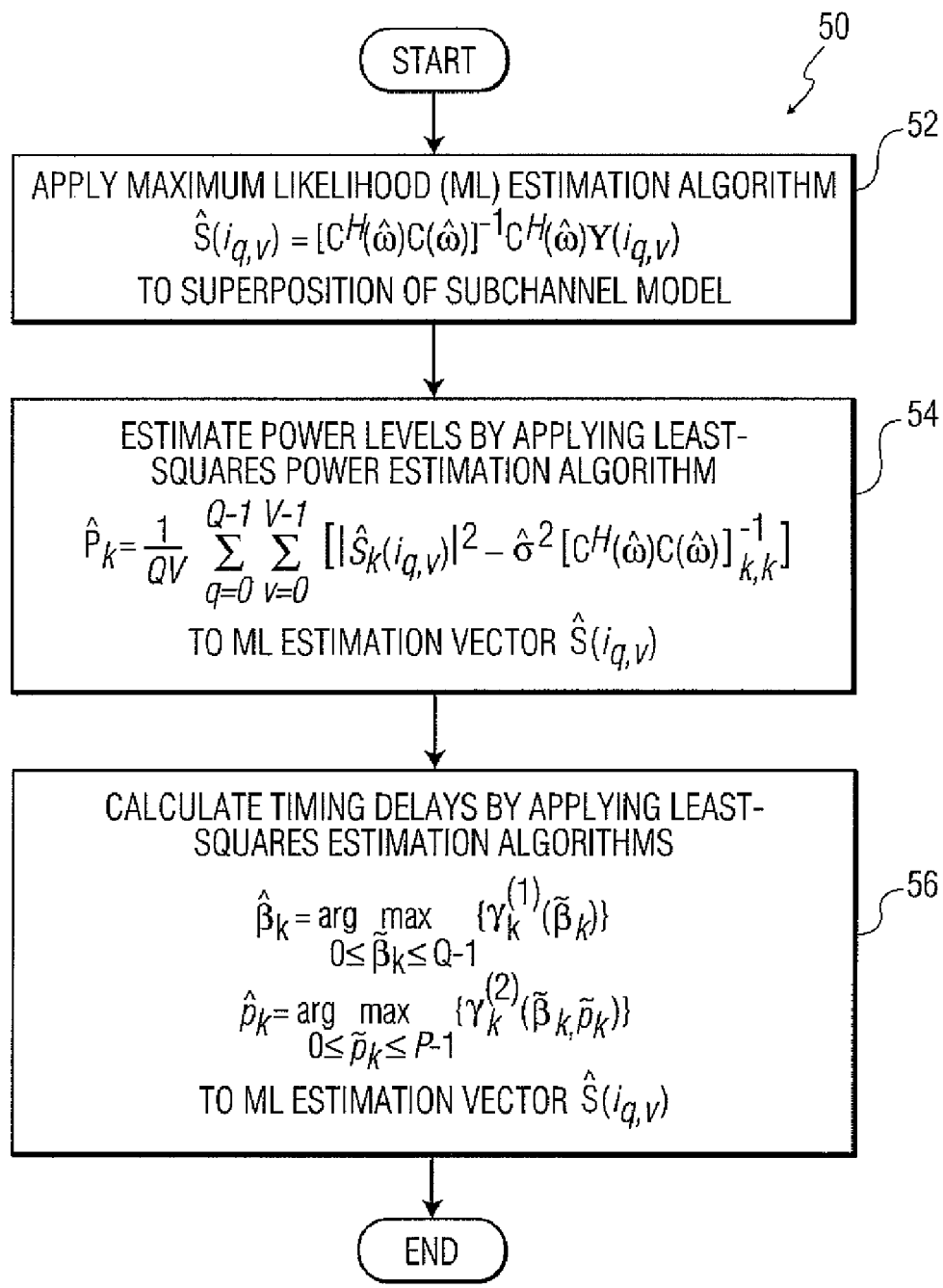
FIG. 6 is a flowchart showing processing steps according to the present invention for estimating power levels and timing delays during initial ranging with reduced computational complexity.

FIG. 6 is a flowchart showing processing steps according to the present invention, indicated generally at 50, for estimating power levels and timing delays during initial ranging with reduced computational load (complexity). This approach relies on the assumption that the CFOs are small during the ranging process and result only in negligible phase rotations over one OFDM block. In such a case, an estimate of $S(\theta)$ can easily be obtained from the observations $\{Y(i_{q,v})\}$ in Equation 11. In step 52, an ML estimation procedure is applied to $\{Y(i_{q,v})\}$. First, a K-dimensional vector $S(i_{q,v})=[S_1(i_{q,v}),S_2(i_{q,v}),\ldots,S_K(i_{q,v})]^T$ is defined in order to rewrite Equation 11 in the equivalent form:

$$Y(i_{q,v})=C(\omega)S(i_{q,v})+n(i_{q,v}) \tag{37}$$

where $C(\omega)=[\Gamma(\omega_1)c_1\Gamma(\omega_2)c_2 \ldots \Gamma(\omega_K)c_K]$ is a matrix of dimensions M×K. Then, after letting $\hat{\omega}\approx\omega$, Equation 37 is used to find the ML estimate in step 52 of $S(i_{q,v})$ as:

$$\hat{S}(i_{q,v})=[C^H(\hat{\omega})C(\hat{\omega})]^{-1}C^H(\hat{\omega})Y(i_{q,v}) \tag{38}$$

Substituting Equation 37 into Equation 38 yields:

$$\hat{S}(i_{q,v})=S(i_{q,v})+\psi(i_{q,v}) \tag{39}$$

where $\psi(i_{q,v})$ is a zero-mean disturbance vector with covariance matrix $\sigma^2[C^H(\hat{\omega})C(\hat{\omega})]^{-1}$. This means that, as long as the simplified model specified in Equation 37 is sufficiently accurate, $\hat{S}(i_{q,v})$ is an unbiased estimate of $S(i_{q,v})$. Its entries $\{\hat{S}(i_{q,v})\}_{k=1}^K$ are then used to compute an estimate of the power level $P_k$ as indicated in step 54:

$$\hat{P}_k = \frac{1}{QV}\sum_{q=0}^{Q-1}\sum_{v=0}^{V-1}\left[|\hat{S}_k(i_{q,v})|^2 - \hat{\sigma}^2[C^H(\hat{\omega})C(\hat{\omega})]^{-1}_{k,k}\right] \tag{40}$$

where $\hat{\sigma}^2$ is still given in Equation 17.

To quantify the computational saving of the simplified ML estimation algorithm of Equation 38 utilized in step 52 with respect to Equation 22, it is observed that $O(MK^2)$ and $O(MK)$ operations are needed to obtain $C^H(\hat{\omega})C(\hat{\omega})$ and $C^H(\hat{\omega})Y(i_{q,v})$, respectively, while $O(K^2)$ operations are further required for evaluating the right hand side of Equation 38. Since $C^H(\hat{\omega})C(\hat{\omega})$ is independent of q and v, the overall complexity involved in the computation of $\hat{S}(i_{q,v})$ for $0\leq q\leq Q-1$ and $0\leq v\leq V-1$ is approximately $O(KQV(M+K))$. Additional $O(QV\log_2 Q)$ operations are eventually needed by the IDFTs in Equation 33. Compared to the first stage of LS-TE, it follows that the computational burden is reduced by a factor $MKQ^2V^2/(M+K)$, which may be significant even for small values of the product QV.

Evaluating $Y_k(\tilde{\theta}_k)$ for each value $\tilde{\theta}_k=0,1,\ldots,\theta_{max}$ may still be computationally demanding, especially when $\theta_{max}$ is large. A viable method to further reduce the system complexity is to decompose the timing error $\theta_k$ into a fractional part $\beta_k$, less than Q, plus an integer part which is multiple of Q. This amounts to setting:

$$\theta_k=\beta_k+p_kQ \tag{41}$$

where $\beta_k \in \{0,1,\ldots,Q-1\}$ while $p_k$ is an integer parameter taking values in the set $\{0,1,\ldots,P-1\}$, with $P=\lfloor\theta_{max}/Q\rfloor$. In such a case, the timing metric of Equation 32 can be manipulated into the equivalent form:

$$Y_k(\tilde{\theta}_k) = Y_k^{(1)}(\tilde{\beta}_k) + Y_k^{(2)}(\tilde{\beta}_k, \tilde{p}_k) \text{ where:} \tag{42}$$

$$Y_k^{(1)}(\tilde{\theta}_k) = \sum_{l=\tilde{\beta}_k}^{\tilde{\beta}_k+L-1}\sum_{v=0}^{V-1}|\hat{s}_k(v,l)|^2 \text{ and:} \tag{43}$$

$$Y_k^{(2)}(\tilde{\beta}_k, \tilde{p}_k) = 2\text{Re}\left\{\sum_{l=\tilde{\beta}_k}^{\tilde{\beta}_k+L-1}\sum_{v=0}^{V-2}\sum_{n=1}^{V-v-1}\hat{s}_k(v,l)\hat{s}_k^*(v+n,l)e^{-j\frac{2\pi n}{N}(l+\tilde{p}_kQ)}\right\} \tag{44}$$

Clearly, maximizing $Y_k(\tilde{\theta}_k)$ with respect to $\tilde{\theta}_k$ requires a grid search over all candidate pairs $(\tilde{\beta}_k,\tilde{p}_k)$. However, the decomposition of Equation 42 provides a reduced-complexity solution to approach the global maximum. This simplified algorithm computes an estimate in step 56 of timing delays $\beta_k$ by looking for the maximum of $Y_k^{(1)}(\tilde{\beta}_k)$, i.e., $$\hat{\beta}_k = \underset{0\leq\tilde{\beta}_k\leq Q-1}{\text{argmax}} \{Y_k^{(1)}(\tilde{\beta}_k)\} \tag{45}$$

Then, after substituting $\hat{\beta}_k$ into the right-hand-side of Equation 42 and maximizing with respect to $\tilde{p}_k$, an estimate of $p_k$ is obtained in step 56 in the form:

$$\hat{p}_k = \underset{0\leq\tilde{p}_k\leq P-1}{\text{argmax}} \{Y_k^{(2)}(\hat{\beta}_k, \tilde{p}_k)\} \tag{46}$$

The timing delay estimate is eventually obtained from Equation 41 as $\hat{\theta}_k=\hat{\beta}_k+\hat{p}_kQ$.

Inspection of Equations 45 and 46 indicates that the simplified estimator maximizes $Y_k(\tilde{\theta}_k)$ in a decoupled fashion, where an estimate of $\beta_k$ is obtained first and is then exploited to get $\hat{p}_k$. In assessing the computational load of this scheme, it is assumed that the quantities $\{\hat{s}_k(v,l)\}_{l=0}^{Q-1}$ have already been computed for $0\leq v\leq V-1$. Then, evaluating $\hat{\beta}_k$ through Equation 45 requires $O(QVL)$ operations while $O(QV^2L)$ operations are needed to get $\hat{p}_k$ from Equation 46. Since estimates $\hat{\beta}_k$ and $\hat{p}_k$ must be obtained for each detected code, the overall complexity in the second stage of the estimation process is approximately $O(KVL(Q+PV))$. Compared to LS-TE, the computational requirement is thus reduced by a factor $\theta_{max}/(Q+PV)$. This advantage is achieved at the price of some performance degradation since the described search procedure is not guaranteed to locate the global maximum of $Y_k(\tilde{\theta}_k)$.

A further simplification is possible by setting V=2. In this case, it is found from Equation 44 that maximizing $Y_k^{(2)}(\hat{\beta}_k, \tilde{p}_k)$ with respect to $\tilde{p}_k$ is equivalent to maximizing $\cos(\phi_k - 2\pi\tilde{p}_kQ/N)$, with.

$$\varphi_k = \arg\left\{\sum_{l=\hat{\beta}_k}^{\hat{\beta}_k+L-1}\hat{s}_k(0,l)\hat{s}_k^*(1,l)e^{-j\frac{2\pi l}{N}}\right\} \tag{47}$$

The estimate $\hat{p}_k$ is thus obtained in closed-form as:

$$\hat{p}_k = \frac{N\varphi_k}{2\pi Q}. \tag{48}$$

The reduced-complexity power estimation provided by the algorithm of Equation 40, and implemented in step 54, is referred to herein as the reduced-complexity power estimator (RC-PE).

Figure 7:
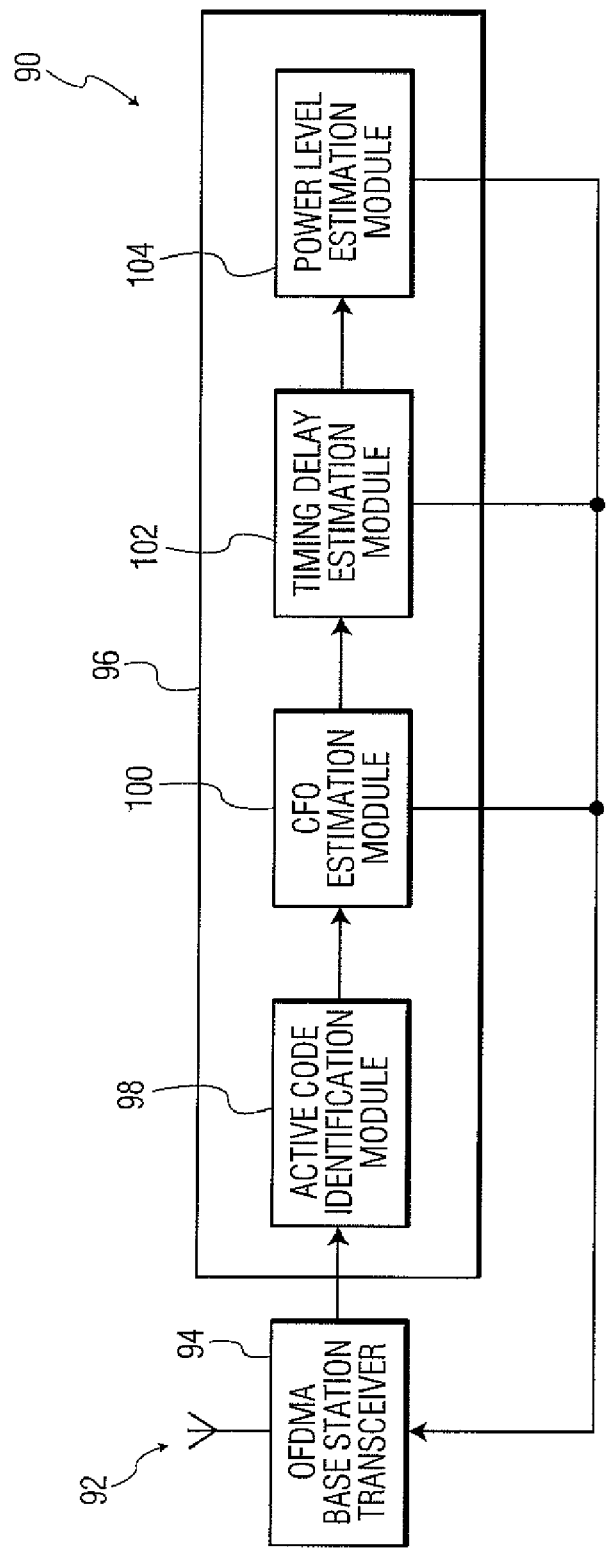
FIG. 7 is a block diagram showing a sample hardware and software/firmware arrangement for implementing the present invention.

FIG. 7 is a block diagram showing a sample hardware and software/firmware arrangement for implementing the present invention, indicated generally at 90. The present invention can be implemented as a plurality of software and/or firmware modules 96 which are executed by a standard OFDMA base station transceiver 94 having an antenna system 92. The base station receiver 94 could be any suitable base station transceiver which operates using OFDM technology. The modules 96 could be coded in any suitable high-level or low-level programming language, such as C, C++, C#, Java, assembly language, or any suitable equivalent. The modules could be provided in an OFDMA transceiver in the form of a customized integrated circuit (IC), or distributed using any suitable computer-readable medium (e.g., diskette, tape, CD-ROM, DVD, portable flash memory device, etc.) for subsequent installation of the modules in an existing OFDMA transceiver. Still farther, the modules could be downloaded to an OFDMA transceiver by way of a network connection (e.g., via the Internet).

The modules 96 are programmed in accordance with the processing steps discussed above, and include an active code identification module 98, a CFO estimation module 100, a timing delay estimation module 102, and a power level estimation module 104. The active code identification module 98 processes the ranging OFDM blocks received by the transceiver 94 from RSSs in communication with the transceiver 94, to identify active codes. The active codes are then processed by the modules 100-104 to provide estimates of the corresponding CFOs, timing delays, and power levels. These estimates are then broadcast by the transceiver 94 to the RSSs so that each one can adjust its transmission parameters to the BS reference scales 94.

Software simulation testing was conducted to ascertain the performance characteristics of the present invention. Simulations of an IEEE 802.16 wireless MAN in accordance with the present invention was conducted, which had a total of N=1024 subcarriers over an uplink bandwidth of 11.4 MHz. The sampling period is $T_s$=87.5 ns, corresponding to a subcarrier distance of $1/(NT_s)$=11.16 kHz. It was assumed that R=8 subchannels were available for initial ranging. Each subchannel was divided into Q=16 tiles uniformly spaced over the signal spectrum at a distance of N/Q=64 subcarriers. To reduce the system complexity, the number of subcarriers in any tile was set to V=2. Each ranging time-slot included M=4 OFDM blocks. The ranging codes were taken from a Fourier set of length 4 and are randomly selected by the RSSs at each simulation run (expect for the sequence $[1,1,1,1]^T$). The discrete-time CIRs had order L=12. Their entries were modeled as independent and circularly symmetric Gaussian random variables with zero means and an exponential power delay profile, i.e., $$E\{|h_k(l)|^2\}=\sigma_{h,k}^2 \exp(-l/12), l=0,1,\ldots,11 \qquad (49)$$

where $\sigma_{h,k}^2$ is related to the average transmission power of the kth RSS. In all subsequent simulations, $\sigma_{h,k}^2$ was chosen such that $E\{\|h_k\|^2\}=1$ for $1\leq k\leq K$. In this way, the powers $\{P_k\}_{k=1}^K$ of the ranging signals are random variables with unit means. Channels of different users were assumed to be statistically independent of each other. They were generated at each new simulation run and kept fixed over an entire time-slot. A cell radius of 10 km was considered, corresponding to a maximum propagation delay of $\theta_{max}$=204 sampling periods. Ranging blocks were preceded by a CP of length $N_G$=256 in order to avoid IBI. The normalized CFOs were uniformly distributed over the interval $[-\Omega,\Omega]$ and varied at each run. Recalling that the estimation range of MFE is $|\epsilon_k|<N/$(2MN$_T$), $\Omega\leq0.1$ was set throughout the simulations. The results of simulations are shown in FIGS. 8-14.

Figure 8:
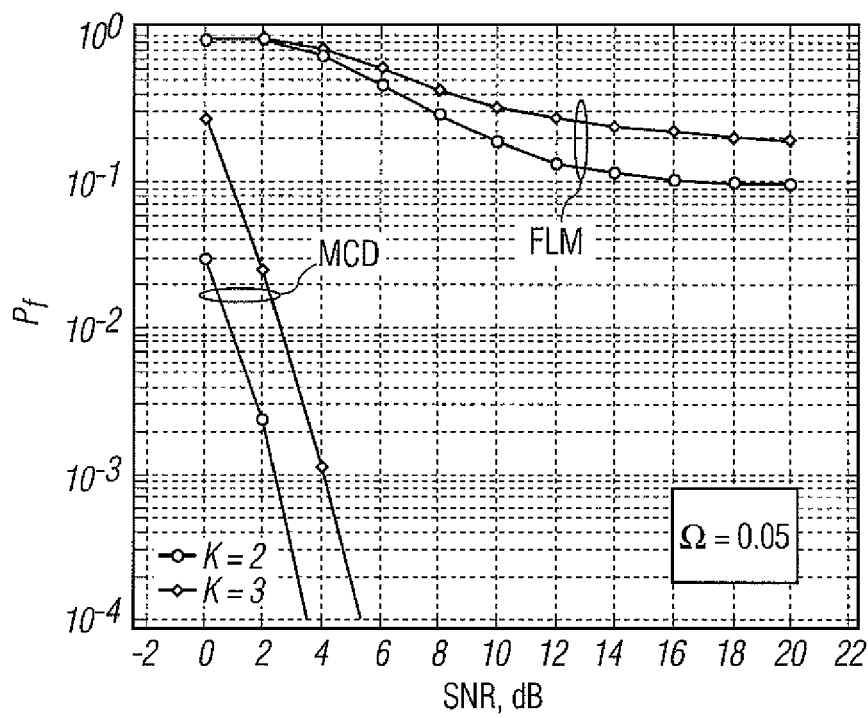
FIGS. 8-14 are graphs showing performance results of the present invention during software simulation testing.

Simulations began by investigating the performance of MCD in terms of probability of making an incorrect detection, say $P_f$. The latter is defined as the probability that the set of detected codes does not coincide with the set of codes participating in the ranging process. FIG. 8 illustrates $P_f$ as a function of the signal-to-noise ratio (SNR) defined as SNR=$1/\sigma^2$. The number of active RSSs is either 2 or 3 while the maximum CFO is $\Omega$=0.05. Comparisons were made with the ranging scheme proposed by Fu, Li and Minn (FLM), where the kth ranging code is declared active provided that the quantity:

$$Z_k = \frac{1}{M^2} \sum_{q=0}^{Q-1} \sum_{v=0}^{V-1} |c_k^H Y(i_{q,v})|^2 \qquad (50)$$

exceeds a suitable threshold $\eta$ which is proportional to the estimated noise power $\hat{\sigma}^2$. The results of FIG. 8 indicate that MCD performs remarkably better than FLM. As expected, the system performance deteriorates as K approaches M. The reason is that increasing K reduces the dimensionality of the noise subspace, which degrades the accuracy of MCD.

Figure 9:
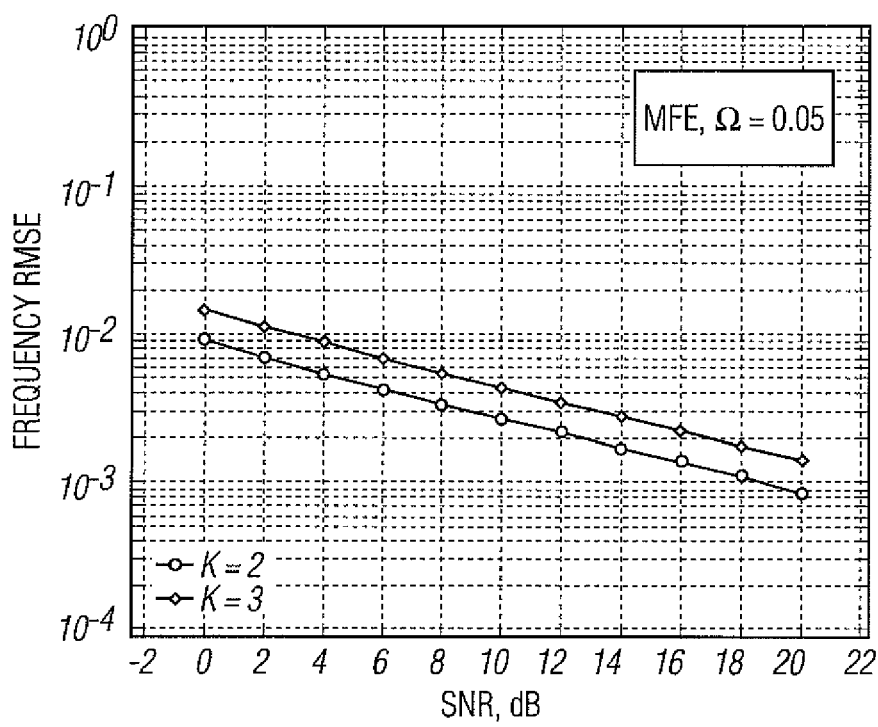

FIG. 9 illustrates the root mean-square error (RMSE) of the frequency estimates obtained with MFE versus SNR for K=2 or 3 and $\Omega$=0.05. It can be seen that the system performance deteriorates as K increases. Nevertheless, the accuracy of MFE is satisfactory under all investigated conditions.

Figure 10:
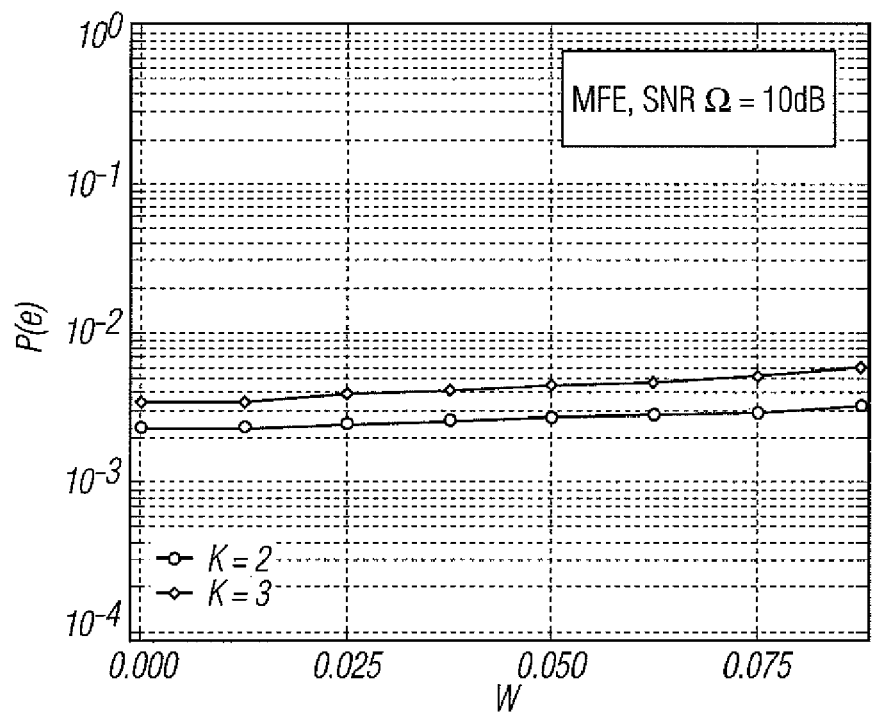

The impact of the CFOs on the performance of MFE was assessed in FIG. 10, where the RMSE is shown as a function of $\Omega$. The SNR was fixed to 10 dB while K was still 2 or 3. As expected, the accuracy of the frequency estimates degrades with $\Omega$ due to increased amount of inter-channel interference (ICI) that affects the received signal. However, the loss is quite small over the full range $\Omega\leq0.1$.

Figure 11:
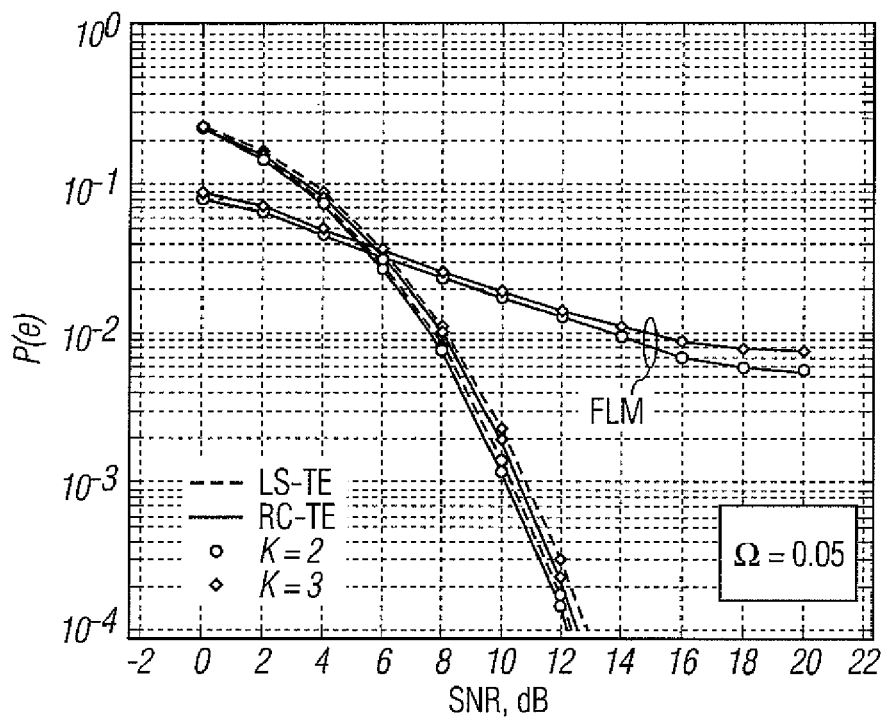

The performance of the timing estimators was measured in terms of probability of making a timing error, say, $P(\epsilon)$. An error event was declared to occur whenever the estimate $\hat{\theta}_k$ gave rise to IBI during the data section of the frame. In such a case, the quantity $\hat{\theta}_k-\theta_k+(L-N_{G,D})/2$ is larger than zero or smaller than $L-N_{G,D}-1$, where $N_{G,D}$ is the CP length during the data transmission period. In our simulations, we set $N_{G,D}$=64. FIG. 11 illustrates $P(\epsilon)$ vs. SNR as obtained with RC-TE, LS-TE and FLM. The number of active codes was K=2 or 3 while $\Omega$=0.05. It can be seen that for SNR larger than 6 dB RC-TE and LS-TE provided much better results than FLM. Also, the loss of RC-TE with respect to LS-TE is negligible in all considered situations.

Figure 12:
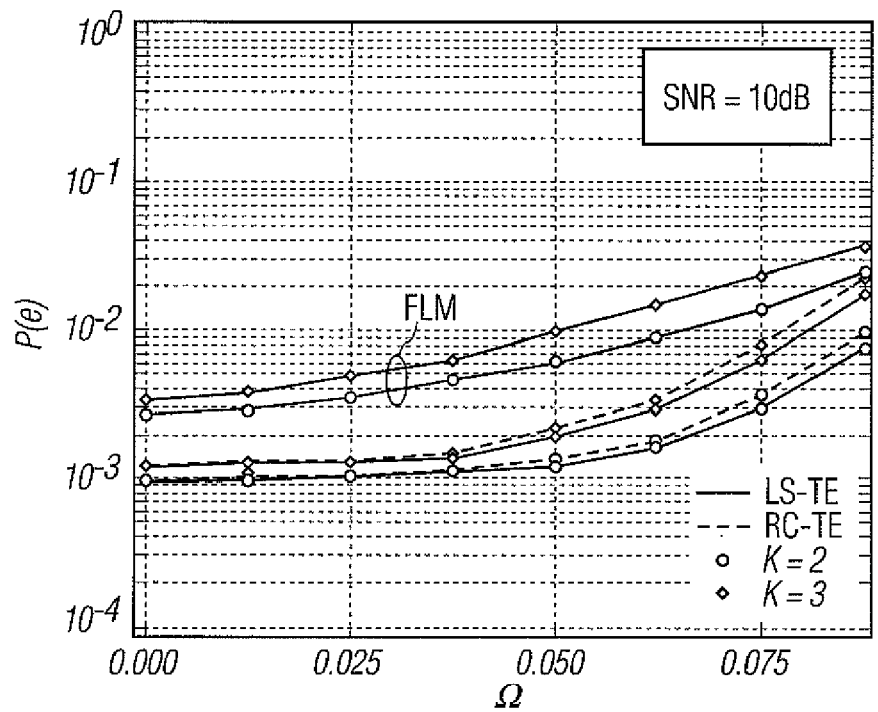

FIG. 12 shows the timing estimators compared in terms of their sensitivity to CFOs. For this purpose, $P(\epsilon)$ is shown as a function of $\Omega$ for K=2 or 3 and SNR=10 dB. Again, it can be seen that LS-TE was slightly better than RC-TE and both schemes outperformed ELM. For K=2 and 3, RC-TE and LS-TE were quite robust to CFOs.

Figure 13:
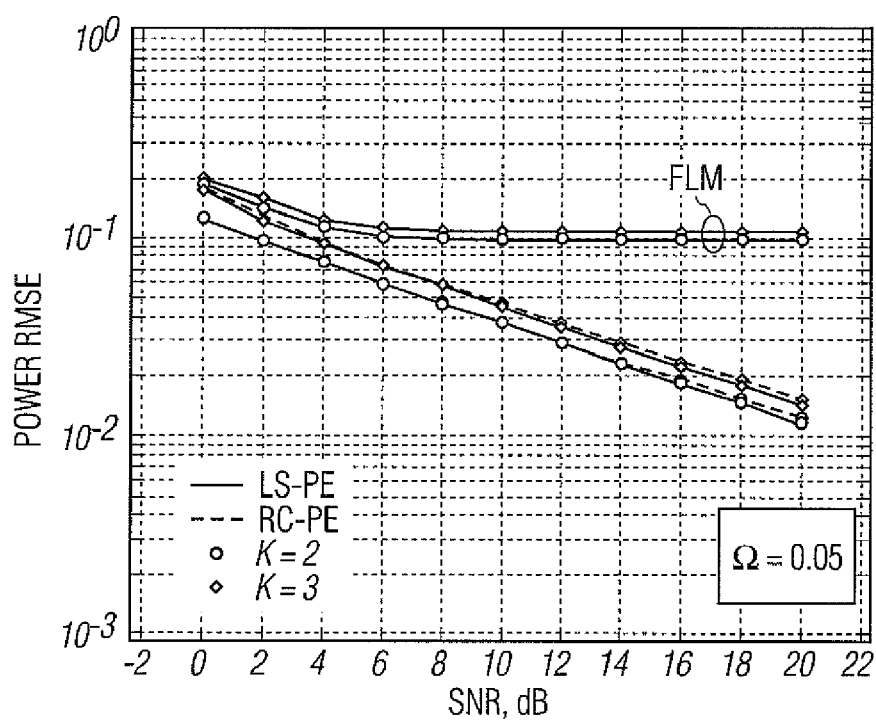

FIG. 13 illustrates the RMSE of the power estimates as a function of SNR. The number of active RSSs was either 2 or 3 while $\Omega$=0.05. Comparisons were made with the known FLM algorithm, where an estimate of $P_k$ is computed as $\hat{P}_k=Z_k/(QV)-\hat{\sigma}^2/M$. As can be seen, in all considered scenarios, RC-PE and LS-PE outperformed FLM. The accuracy of RC-PE and LS-PE reduced as K grew large, while the performance of FLM was nearly the same with either K=2 or 3.

Figure 14:
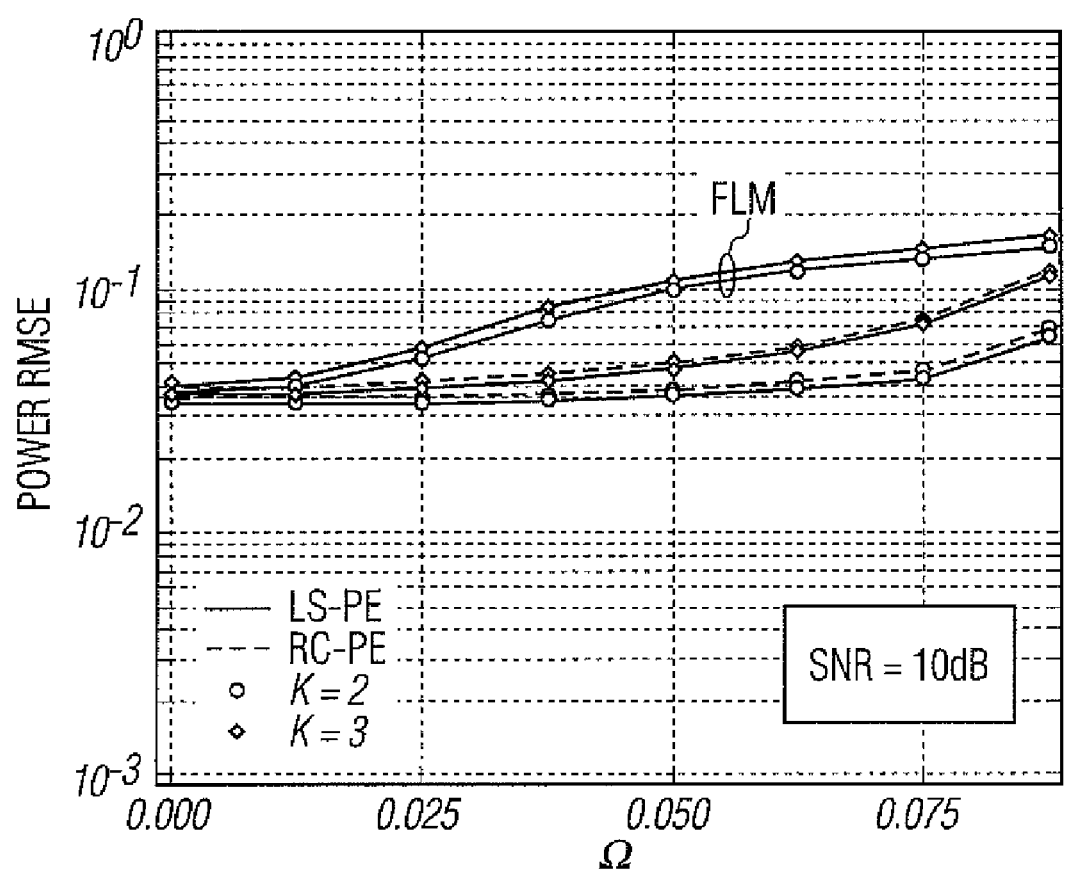

The impact of residual CFOs on the RMSE of the power estimates was assessed as shown in FIG. 14, where the RMSE is shown as a function of Ω. Again, the SNR was fixed to 10 dB and K was either 2 or 3. As can be seen, LS-PE performed slightly better than RC-PE. Both schemes were extremely robust to CFOs when K is either 2 or 3.

Figure 15:
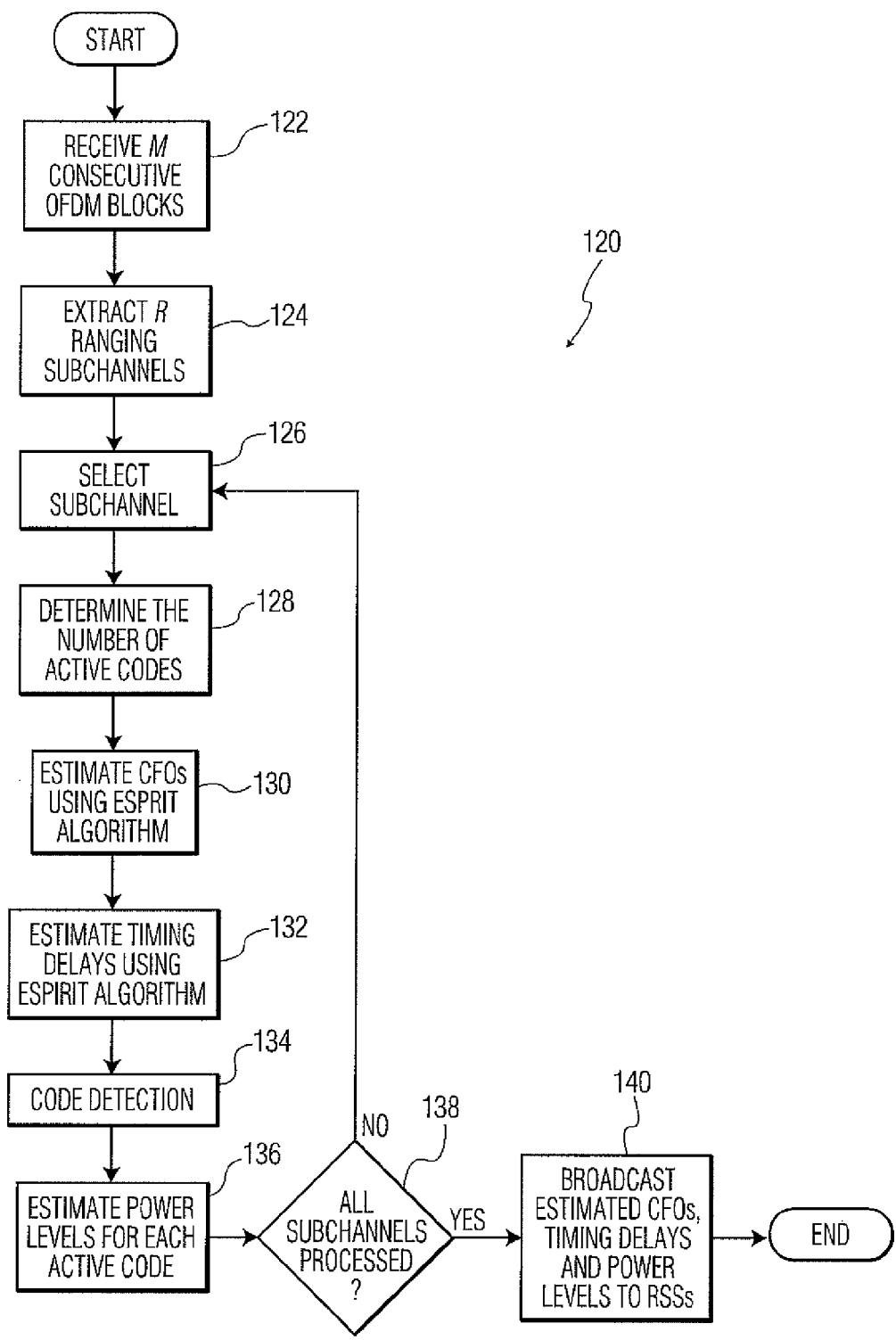
FIG. 15 is a flowchart showing another embodiment of the present invention, wherein CFOs and timing delays are estimated using an ESPRIT algorithm.

FIG. 15 is a flowchart showing another embodiment of the present invention, indicated generally at 120, wherein CFOs, timing errors, and power levels are estimated using the known EPSRIT algorithm. The ESPRIT algorithm is beneficial because it can be implemented with reduced computational complexity, and is suitable for use in systems where pilot symbols are spread in both the time and frequency domains using ranging codes belonging to a Fourier basis.

The embodiment shown in FIG. 15 can be employed in an OFDMA system employing N subcarriers with index set $\{0, 1, \ldots, N-1\}$. It is assumed that a ranging time-slot is composed by M consecutive OFDMA blocks while the N available subcarriers are grouped into ranging subchannels and data subchannels. The former are used by the active RSSs to initiate their ranging processes, while the latter are assigned to DSSs for data transmission. R denotes the number of ranging subchannels, and it is assumed that each of them is divided into Q subbands. A given subband is composed of a set of V adjacent subcarriers, which is called a tile. The subcarrier indices of the qth tile ($q=0, 1, \ldots, Q-1$) in the rth subchannel ($r=0, 1, \ldots, R-1$) are collected into a set $J_q^{(r)} = \{i_q^{(r)}+v\}_{v=0}^{V-1}$, where the tile index $i_q^{(r)}$ can be chosen adaptively according to the actual channel conditions. The only constraint in the selection of $i_q^{(r)}$ is that different tiles must be disjoint, i.e., $J_{q_1}^{(r_1)} \cap J_{q_2}^{(r_2)} = \emptyset$ for $q_1 \neq q_2$ or $r_1 \neq r_2$. The rth ranging subchannel is thus composed of QV subcarriers with indices in the set $J^{(r)} = \cup_{q=0}^{Q-1} J_q^{(r)}$, while a total of $N_R = QVR$ ranging subcarriers is available in each OFDMA block.

It is assumed that each subchannel can be accessed by a maximum number of $K_{max} = \min\{V, M\} - 1$. RSSs, which are separated by means of orthogonal codes in both the time and frequency domains. The codes are selected in a pseudo-random fashion from a predefined set $\{C_0, C_1, \ldots, C_{K_{max}-1}\}$ with $$[C_k]_{v,m} = e^{j2\pi k \left(\frac{v}{V-1} + \frac{m}{M-1}\right)} \tag{51}$$

where $v=0, 1, \ldots, V-1$ counts the subcarriers within a tile and is used to perform spreading in the frequency domain, while $m=0, 1, \ldots, M-1$ is the block index by which spreading is done in the time domain across the ranging time-slot. It is assumed that different RSSs select different codes. Also, it is assumed that a selected code is employed by the corresponding RSS over all tiles in the considered subchannel. Without loss of generality, we concentrate on the rth subchannel and denote by $K \leq K_{max}$ the number of simultaneously active RSSs. To simplify the notation, the subchannel index $^{(r)}$ is dropped henceforth.

The signal transmitted by the kth RSS propagates through a multipath channel characterized by a channel impulse response (CIR) $h_k = [h_k(0), h_k(1), \ldots, h_k(L-1)]^T$ of length L (in sampling periods). We denote by $\theta_k$ the timing error of the kth RSS expressed in sampling intervals $T_s$, while $\epsilon_k$ is the frequency offset normalized to the subcarrier spacing. During IR, the CFOs are only due to Doppler shifts and/or to estimation errors and, in consequence, they are assumed to lie within a small fraction of the subcarrier spacing. Timing offsets depend on the distance of the RSSs from the BS and their maximum value is thus limited to the round trip delay from the cell boundary. In order to eliminate IBI, it is assumed that, during the ranging process, the CP length comprises $N_G \geq \theta_{max} + L$ sampling periods, where $\theta_{max}$ is the maximum expected timing error. This assumption is not restrictive as initialization blocks are usually preceded by long CPs in many standardized OFDM systems.

In step 126, a ranging subchannel is extracted from the DFT outputs corresponding to the received OFDM blocks. We denote by $X_m(q) = [X_m(i_q), X_m(i_q+1), \ldots, X_m(i_q+V-1)]^T$ the DFT outputs corresponding to the qth tile in the mth OFDMA block. Since DSSs have successfully completed their IR processes, they are perfectly aligned to the BS references and their signals do not contribute to $X_m(q)$. In contrast, the presence of uncompensated CFOs destroys orthogonality among ranging signals and gives rise to ICI. The latter results in a disturbance term plus an attenuation of the useful signal component. To simplify the analysis, in the ensuing discussion the disturbance term is treated as a zero-mean Gaussian random variable while the signal attenuation is considered as part of the channel impulse response. Under the above assumptions, we may write $$X_m(i_q + v) = \sum_{k=1}^{K} [C_{l_k}]_{v,m} e^{jm\omega_k N_T} d_k(q) H_k(\theta_k, \epsilon_k, i_q + v) + w_m(i_q + v) \tag{52}$$

where $\omega_k = 2\pi\epsilon_k/N$, $N_T = N + N_G$ denotes the duration of the cyclically extended block and $C_{l_k}$ is the code matrix selected by the kth RSS. The quantity $d_k(q)$ is a unit-amplitude PSK symbol transmitted by the kth RSS on the qth tile while $H_k(\theta_k, \epsilon_k, n)$ is the kth equivalent channel frequency response over the nth subcarrier and is given by $$H_k(\theta_k, \epsilon_k, n) = \gamma_N(\epsilon_k) H_k'(n) e^{-j2\pi n \theta_k/N} \tag{53}$$

where $$H_k'(n) = \sum_{l=0}^{L-1} h_k'(l) e^{-j2\pi n l/N}$$

is the true channel frequency response, while $$\gamma_N(\epsilon) = \frac{\sin(\pi\epsilon)}{N \sin(\pi\epsilon/N)} e^{j\pi\epsilon(N-1)/N} \tag{54}$$

is the attenuation factor induced by the CFO. In many practical situations, the contribution of $\gamma_N(\epsilon)$ can be ignored since its magnitude is close to unity. As an example, for N=1024 and $|\epsilon|<0.1$ we have $|\gamma_N(\epsilon)|>0.98$. The last term in Equation 52 accounts for background noise and is modeled as a circularly symmetric complex Gaussian random variable with zero-mean and variance $\sigma_w^2 = \sigma_n^2 + \sigma_{ICI}^2$, where $\sigma_n^2$ and $\sigma_{ICI}^2$ are the average noise and ICI powers, respectively. As mentioned earlier, the code matrix selected by each RSS is employed over all tiles in the considered subchannel. Furthermore, from Equation 53 we see that $\theta_k$ appears only as a phase shift across the DFT outputs. The reason is that the CP duration is longer than the maximum expected propagation delay, thereby making the ranging signals quasi-synchronous at the BS.

To proceed further, it is assumed that the tile width is much smaller than the channel coherence bandwidth. In this case, the channel response is nearly flat over each tile and we may reasonably replace the quantities $\{H_k'(i_q+v)\}_{v=0}^{V-1}$ with an average frequency response $$\overline{H}_q' = \frac{1}{V} \sum_{v=0}^{V-1} H_k'(i_q + v). \quad (55)$$

Substituting Equations 51 and 53 into Equation 52, and bearing in mind Equation 55, yields $$X_m(i_q + v) = \sum_{k=1}^{K} e^{j2\pi(m\xi_k + v\eta_k)} S_k(q) + w_m'(i_q + v) \quad (56)$$

where $S_k(q) = \gamma_N(\epsilon_k)\overline{H}_k'(q)e^{-j2\pi i_q \theta_k/N}$ and we have defined the quantities $$\xi_k = \frac{1_k}{M-1} + \frac{\epsilon_k N_T}{N} \quad (57)$$

and $$\eta_k = \frac{1_k}{V-1} - \frac{\theta_k}{N} \quad (58)$$

which are referred to as the effective CFOs and timing errors, respectively.

As discussed below, the DFT outputs $\{X_m(i_q+v)\}$ can be exploited to identify the active codes and to estimate the corresponding timing errors and CFOs.

In step 128, the number K of active codes over the considered ranging subchannel is determined. For this purpose, we collect the $(i_q+v)$ th DFT outputs across all ranging blocks into an M-dimensional vector $Y(i_{q,v})=[X_0(i_q+v),X_1(i_q+v),\ldots,X_{M-1}(i_q+v)]^T$ given by $$Y(i_{q,v}) = \sum_{k=1}^{K} e^{j2\pi v\eta_k} S_k(q) e_M(\xi_k) + w(i_{q,v}) \quad (59)$$

where $w(i_{q,v})=[w_0(i_q+v),w_1(i_q+v),\ldots,w_{M-1}(i_q+v)]^T$ is Gaussian distributed with zero mean and covariance matrix $\sigma_w^2 I_M$ while $e_M(\xi)=[1,e^{j2\pi\xi},e^{j4\pi\xi},\ldots,e^{j2\pi(M-1)\xi}]^T$.

From Equation 59 above, it can be observed that $Y(i_{q,v})$ has the same structure as measurements of multiple uncorrelated sources from an array of sensors. Hence, an estimate of K can be obtained by performing an EVD of the correlation matrix $R_Y = E\{Y(i_{q,v})Y^H(i_{q,v})\}$. In practice, however, $R_Y$ is not available at the receiver and must be replaced by some suitable estimate. One popular strategy to get an estimate of $R_Y$ is based on the FB principle. Following this approach, $R_Y$ is replaced by $$\hat{R}_Y = \frac{1}{2}(\tilde{R}_Y + J\tilde{R}_Y^* J^T) \quad (60)$$

where $\tilde{R}_Y$ is the sample correlation matrix $$\tilde{R}_Y = \frac{1}{QV} \sum_{q=0}^{Q-1} \sum_{v=0}^{V-1} Y(i_{q,v}) Y^H(i_{q,v}) \quad (61)$$

while J is the exchange matrix with 1's on the anti-diagonal and 0's elsewhere. Arranging the eigenvalues $\hat{\lambda}_1 \geq \hat{\lambda}_2 \geq \ldots \geq \hat{\lambda}_{M-1}$ of $\hat{R}_Y$ in non-increasing order, an estimate $\hat{K}$ of the number of active codes can be found by applying the MDL information-theoretic criterion. This amounts to looking for the minimum of the following objective function $$F(\tilde{K}) = \frac{1}{2}\tilde{K}(2M - \tilde{K})\ln(QV) - QV(M - \tilde{K})\ln\rho(\tilde{K}) \quad (62)$$

where $\rho(\tilde{K})$ is the ratio between the geometric and arithmetic means of $\{\hat{\lambda}_{\tilde{K}-1}, \hat{\lambda}_{\tilde{K}+2}, \ldots, \hat{\lambda}_M\}$.

In step 130, CFOs are estimated using the ESPRIT algorithm. For simplicity, it is assumed that the number of active codes has been perfectly estimated. Then, an estimate of $\xi = [\xi_1, \xi_2, \ldots, \xi_K]^T$ can be found by applying the ESPRIT algorithm to the model set forth in Equation 59. The eigenvectors of $\hat{R}_Y$ associated to the K largest eigenvalues $\hat{\lambda}_1 \geq \hat{\lambda}_2 \geq \ldots \geq \hat{\lambda}_K$ are arranged into an M×K matrix $Z=[z_1 z_2 \ldots z_K]$. Next, we consider the matrices $Z_1$ and $Z_2$ that are obtained by collecting the first M−1 rows and the last M−1 rows of Z, respectively. The entries of $\xi$ are finally estimated in a decoupled fashion as $$\hat{\xi}_k = \frac{1}{2\pi}\arg\{\rho_y(k)\}, \quad (63)$$
$$k = 1, 2, \ldots, K$$

where $\{\rho_y(1), \rho_y(2), \ldots, \rho_y(K)\}$ are the eigenvalues of $$Z_Y = (Z_1^H Z_1^H)^{-1} Z_1^H Z_2 \quad (64)$$

and $\arg\{\rho_y(k)\}$ denotes the phase angle of $\rho_y(k)$ taking values in the interval $[-\pi, \pi)$.

After computing estimates of the effective CFOs through Equation 63, the problem arises of matching each $\hat{\xi}_k$ to the corresponding code $C_{l_k}$. This amounts to finding an estimate of $l_k$ starting from $\hat{\xi}_k$. For this purpose, we denote by $|\epsilon_{max}|$ the magnitude of the maximum expected CFO and observe from Equation 57 that $(M-1)\xi_k$ belongs to the interval $J_{l_k} = [l_k - \beta; l_k + \beta]$, with $\beta = |\epsilon_{max}| N_T(M-1)/N$. It follows that the effective CFOs can be univocally mapped to their corresponding codes as long as $\beta < 1/2$ since only in that case intervals $\{J_{l_k}\}_{k=1}^K$ are disjoint. The acquisition range of the frequency estimator is thus limited to $|\epsilon_{max}| < N/(2N_T(M-1))$ and an estimate of the pair $(l_k, \epsilon_k)$ is computed as $$\hat{l}_k = \text{round}((M-1)\hat{\xi}_k) \text{ and} \quad (65)$$

$$\hat{\epsilon}_k = \frac{N}{N_T}\left(\hat{\xi}_k - \frac{\hat{l}_k}{M-1}\right) \quad (66)$$

It is worth noting that the $\arg\{\cdot\}$ function in Equation 63 has an inherent ambiguity of multiples of $2\pi$, which translates into a corresponding ambiguity of the quantity $\hat{l}_k$ by multiples of M−1. Hence, recalling that $l_k \in \{0, 1, \ldots, K_{max}-1\}$ with $K_{max} < M$, a refined estimate of $l_k$ can be found as $$\hat{l}_k^{(F)} = [\hat{l}_k]_{M-1} \quad (67)$$

where $[x]_{M-1}$ is the value of x reduced to the interval $[0, M-2]$. Equation 66 is referred to below as the ESPRIT-based frequency estimator (EFE).

In step 132, timing errors are estimated next. We call $X_m(q) = [X_m(i_q), X_m(i_q+1), \ldots, X_m(i_q+V-1)]^T$ the V-dimensional vector of the DFT outputs corresponding to the qth tile in the mth OFDM block. Then, from Equation 56, we have $$X_m(q) = \sum_{k=1}^{K} e^{j2\pi m \xi_k} S_k(q) e_V(\eta_k) + w_m(q) \tag{68}$$

where $w_m(q) = [w_m(i_q), w_m(i_q+1), \ldots, w_m(i_q+V-1)]^T$ is Gaussian distributed with zero mean and covariance matrix $\sigma_w^2 I_V$ while $e_V(\eta) = [1, e^{j2\pi\eta}, e^{j4\pi\eta}, \ldots, e^{j2\pi(V-1)\eta}]^T$. Since $X_m(q)$ is a superposition of complex sinusoidal signals with random amplitudes embedded in white Gaussian noise, an estimate of $\eta = [\eta_1, \eta_2, \ldots, \eta_K]^T$ can still be obtained by resorting to the ESPRIT algorithm. Following the previous steps, we first compute $$\hat{R}_X = \frac{1}{2}(\tilde{R}_X + J\tilde{R}_X^T J), \tag{69}$$

with $$\tilde{R}_X = \frac{1}{MQ} \sum_{m=0}^{M-1} \sum_{q=0}^{Q-1} X_m(q) X_m^H(q). \tag{69}$$

Then, we define a V×K matrix $U = [u_1 u_2 \ldots u_K]$ whose columns are the eigenvectors of $\hat{R}_X$ associated to the K largest eigenvalues. The effective timing errors are eventually estimated as $$\hat{\eta}_k = \frac{1}{2\pi} \arg\{\rho_X(k)\}, \tag{70}$$
$$k = 1, 2, \ldots, K$$

where $\{\rho_X(1), \rho_X(2), \ldots, \rho_X(K)\}$ are the eigenvalues of $$U_X = (U_1^H U_1)^{-1} U_1^H U_2 \tag{71}$$

while the matrices $U_1$ and $U_2$ are obtained by collecting the first V−1 rows and the last V−1 rows of U, respectively.

The quantities $\{\hat{\eta}_k\}_{k=1}^{K}$ are eventually used to find estimates $(\hat{l}_k, \hat{\theta}_k)$ of the associated ranging code and timing error. To accomplish this task, we let $\alpha = \theta_{max}(V-1)/(2N)$. Then, recalling that $0 \leq \theta_k \leq \theta_{max}$, from Equation 58, it can be seen that $(V-1)\eta_k + \alpha$ falls into the range $I_{l_k} = [l_k - \alpha; l_k + \alpha]$. If $\theta_{max} < N/(V-1)$, the quantity $\alpha$ is smaller than ½ and, in consequence, intervals $\{I_{l_k}\}_{k=1}^{K}$ are disjoint. In this case, there is only one pair $(l_k, \theta_k)$ that results into a given $\eta_k$ and an estimate of $(l_k, \theta_k)$ is found as $$\hat{l}_k = \text{round}((V-1)\hat{\eta}_k + \alpha) \tag{72}$$
and $$\hat{\theta}_k = N\left(\frac{\hat{l}_k}{V-1} - \hat{\eta}_k\right) \tag{73}$$

A refined estimate of $l_k$ is obtained in the form $$\hat{l}_k^{(f)} = [\hat{l}_k]_{V-1}. \tag{74}$$

Equation 73 is referred to below as the ESPRIT-based timing estimator (ETE).

In step 34, code detection is performed. From Equations 67 and 74, it can be seen that two distinct estimates $\hat{l}_k^{(F)}$ and $\hat{l}_k^{(f)}$ are available at the receiver for each code index $l_k$. These estimates are now used to decide which codes are actually active in the considered ranging subchannel. For this purpose, we define two sets $I^{(f)} = \{\hat{l}_k^{(f)}\}_{k=1}^{K}$ and $I^{(F)} = \{\hat{l}_k^{(F)}\}_{k=1}^{K}$ and observe that, in the absence of any detection error, it should be $I^{(f)} = I^{(F)} = \{l_k\}_{k=1}^{K}$. Hence, for any code matrix $C_m \in C$ the following detection strategy is utilized:

$$C_m \text{ is declared as } \begin{cases} \text{detected} & \text{if } m \in I^{(f)} \cap I^{(F)} \\ \text{undetected} & \text{if } m \notin I^{(f)} \cap I^{(F)} \end{cases}. \tag{75}$$

The BS notifies the detected codes through a downlink response message. Clearly, if an active RSS is using an undetected code, it must repeat its ranging process until success notification. Equation 75 is referred to below as the ESPRIT-based code detector (ECD).

In step 136, power levels are eventually estimated. Assume that the accuracy of the frequency and timing estimates provided by EFE and ETE is such that $\hat{\xi} \approx \xi$ and $\hat{\eta} \approx \eta$. Then, the ML estimate of $\hat{S}(q) = [S_1(q), S_2(q), \ldots, S_K(q)]^T$ for $q = 0, 1, \ldots, Q-1$ based on the observation vectors $X_m(q)$ is found to be $$\hat{S}(q) = T^{-1}(\hat{\xi}, \hat{\eta}) \overline{X}(q; \hat{\xi}, \hat{\eta}) \tag{76}$$

where $$T(\hat{\xi}, \hat{\eta}) = \sum_{m=0}^{M-1} E_m^H(\hat{\xi}, \hat{\eta}) E_m(\hat{\xi}, \hat{\eta}) \tag{77}$$

and $$\overline{X}(q; \hat{\xi}, \hat{\eta}) = \sum_{m=0}^{M-1} E_m^H(\hat{\xi}, \hat{\eta}) X_m(q) \tag{78}$$

while $E_m(\xi, \eta)$ is a V×K matrix with entries $$[E_m(\hat{\xi}, \hat{\eta})]_{v+1,k} = e^{j2\pi(m\xi_k + v\eta_k)} \, 0 \leq v \leq V-1, \, 1 \leq k \leq K. \tag{79}$$

From Equation 52 and letting $\hat{S}(q) = [S_1(q), S_2(q), \ldots, S_K(q)]^T$ yields $$\hat{S}_k(q) = S_k(q) + \mu_k(q), k = 1, 2, \ldots, K \tag{80}$$

where $\mu_k(q)$ is a zero-mean disturbance term with variance $\sigma_{\mu_k}^2 = \sigma_w^2 [T^{-1}(\hat{\xi}, \hat{\eta})]_{k,k}$. The above equation indicates that an unbiased estimator of $|S_k(q)|^2$ is given by $|S_k(q)|^2 - \sigma_{\mu_k}^2$.

Finally, we define the average power of the kth RSS over the employed ranging subcarriers as $$P_k = \frac{1}{Q}\sum_{q=0}^{Q-1} |S_k(q)|^2. \quad (81)$$

This leads to the following ad hoc power estimator (AHPE):

$$\hat{P}_k = \frac{1}{Q}\sum_{q=0}^{Q-1}\left[|\hat{S}_k(q)|^2 - \hat{\sigma}^2_{\mu_k}\right] \quad (82)$$

where $\hat{\sigma}^2_{\mu_k} = \hat{\sigma}^2_w [T^{-1}(\hat{\xi},\hat{\eta})]_{k,k}$ and $\hat{\sigma}^2_w$ is given by $$\hat{\sigma}^2_w = \frac{1}{M-\hat{K}}\sum_{i=\hat{K}+1}^{M} \hat{\lambda}_i. \quad (83)$$

In step 138, a determination is made as to whether additional ranging subchannels exist. If a positive determination is made, step 126 occurs again, and the processing steps shown in FIG. 15 are repeated so that the additional ranging subchannels can be processed. Otherwise, step 140 occurs, wherein the estimated CFOs, timing errors, and power levels are broadcast to remote users. In the downlink response message, the BS will indicate only the detected codes while undetected RSSs must restart their ranging process.

Figure 16A:
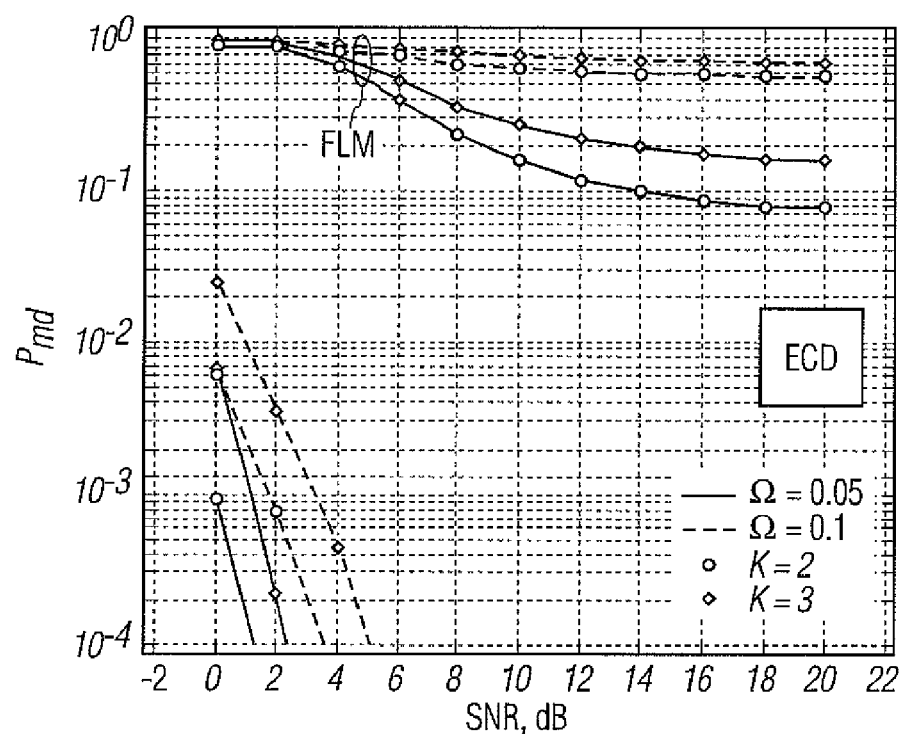
FIGS. 16A-16C are graphs showing performance results of the embodiment of the present invention shown in FIG. 15, during software simulation testing.
Figure 16B:
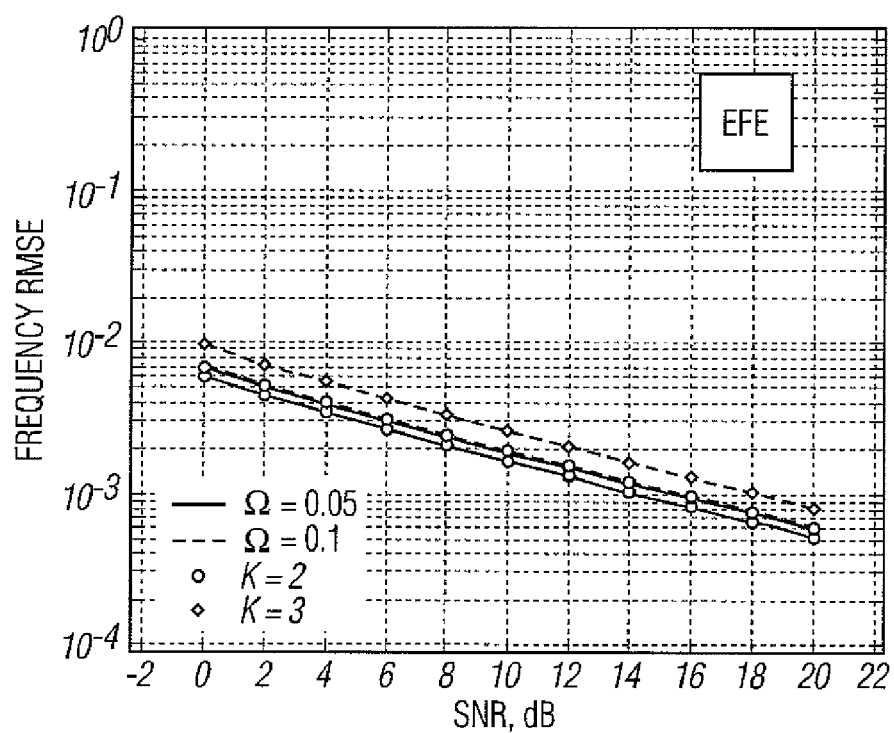
Figure 16C:
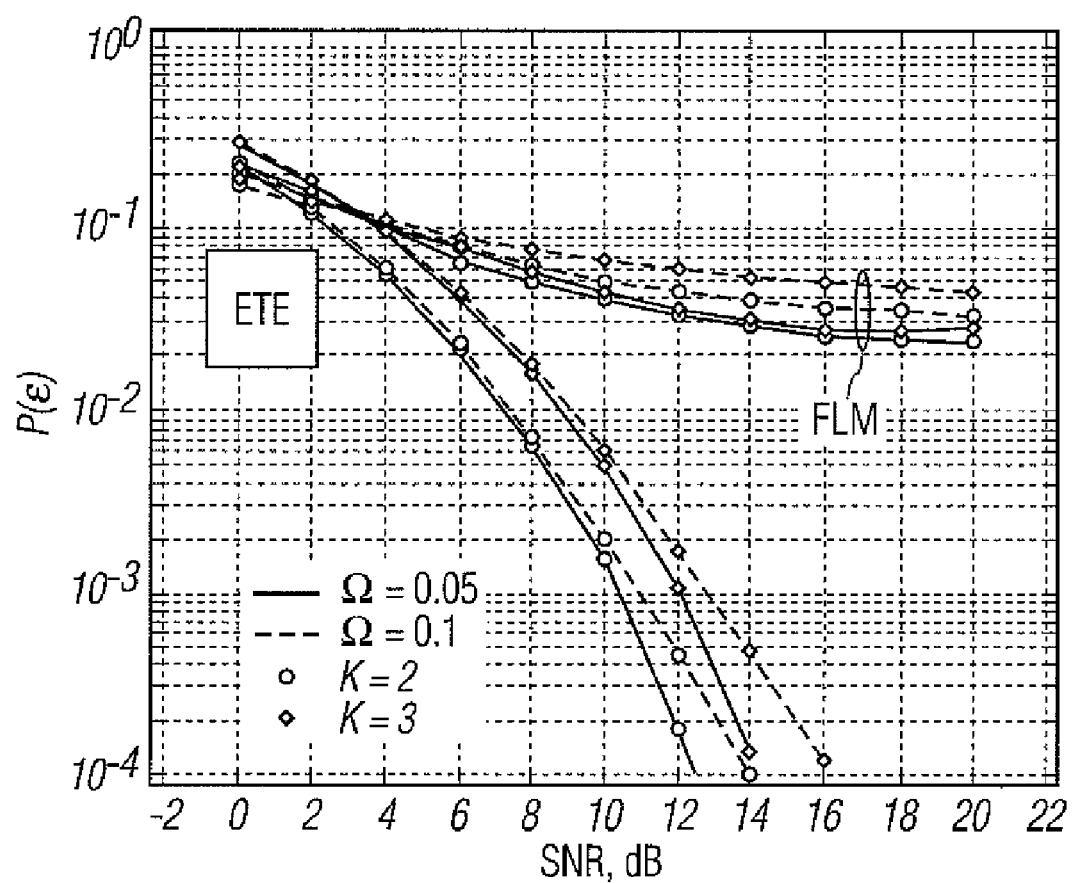

FIGS. 16A-16C are graphs showing performance results of the ESPRIT-based embodiment of the present invention discussed above in connection with FIG. 15, obtained in software simulations. The investigated system had a total of N=1024 subcarriers over an uplink bandwidth of 3 MHz. The sampling period was $T_s$=0.33 μs, corresponding to a subcarrier distance of $1/(NT_s)$=2960 Hz. It was assumed that R=4 subchannels were available for IR. Each subchannel was divided into Q=16 tiles uniformly spaced over the signal spectrum at a distance of N/Q=64 subcarriers. The number of subcarriers in any tile was V=4 while M=4. The discrete-time CIRs had L=12 taps which were modeled as independent and circularly symmetric Gaussian random variables with zero means and an exponential power delay profile, i.e., $E\{|h_k(l)|^2\}=\sigma_h^2 \times \exp(-l/12)$ for l=0,1, ..., 11, where $\sigma_h^2$ is chosen such that $E\{\|h_k\|^2\}=1$. Channels of different users were statistically independent of each other and were kept fixed over an entire time-slot. We considered a maximum propagation delay of $\theta_{max}$=204 sampling periods. Ranging blocks were preceded by a CP of length $N_G$=256. The normalized CFOs are uniformly distributed over the interval $[-\Omega,\Omega]$ and vary at each run. Recalling that the estimation range of EFE is $|\epsilon_k|<N/(2N_T(M-1))$, we set $\Omega \leq 0.1$.

Performance testing began by investigating the performance of ECD in terms of probability of making an incorrect detection. FIG. 16A illustrates $P_f$ as a function of SNR=$1/\sigma_n^2$. The number of active RSSs was 2 and 3 while the maximum CFO was either $\Omega$=0.05 or 0.1. Comparisons were made with the ranging scheme proposed by Fu, Li and Minn (FLM). The results of FIG. 16A indicate that ECD performs remarkably better than FLM.

FIG. 16B illustrates the RMSE of the frequency estimates obtained with EFE vs. SNR for K=2 or 3 and $\Omega$=0.05 or 0.1. It can be seen that the accuracy of EFE is satisfactory at SNR values of practical interest. Moreover, EFE has virtually the same performance as K or $\Omega$ increase.

The performance of the timing estimators is measured in terms of probability of making a timing error, say P($\epsilon$). An error event is declared to occur whenever the estimate $\hat{\theta}_k$ gives rise to IBI during the data section of the frame. This is tantamount to saying that the timing error $\hat{\theta}_k - \theta_k + (L-N_{G,D})/2$ is larger than zero or smaller than $L-N_{G,D}-1$, where $N_{G,D}$ is the CP length during the data transmission phase. For testing purposes, we set $N_{G,D}$=32. FIG. 16C illustrates P($\epsilon$) vs. SNR as obtained with ETE and FLM. The number of active codes is K=2 or 3 while $\Omega$=0.05 or 0.1. It can be seen that ETE provides much better results than FLM.

Having thus described the invention in detail it is to be understood that the foregoing description is not intended to limit the spirit or scope thereof. What is desired to be protected is set forth in the following claims.

What is claimed is:

1. A method for initial ranging in a wireless communication system, comprising the steps of:
   receiving at a base station a plurality of blocks transmitted to the base station from a plurality of remote user devices in wireless communication with the base station;
   processing the plurality of blocks to extract a ranging subchannel from the plurality of blocks;
   calculating a total number of active codes in the ranging subchannel by computing a correlation matrix and applying an eigendecomposition procedure to the correlation matrix, and using a minimum description length algorithm;
   estimating carrier frequency offsets for all active devices of the plurality of remote user devices in a first processing step using the active codes;
   estimating timing delays for all active devices of the plurality of remote user devices in a second processing step using the active codes;
   estimating power levels for all active devices of the plurality of remote user devices in a third processing step using the active codes;
   broadcasting the estimated carrier frequency offsets, timing delays, and power levels to the plurality of remote user devices; and
   adjusting transmission parameters of the plurality of remote user devices in response to the broadcasted estimates to synchronize communication with the base station.

2. The method of claim 1, wherein the step of processing the plurality of blocks further comprises applying a discrete Fourier transformation algorithm to the plurality of blocks to extract the ranging subchannel.

3. The method of claim 1, wherein the step of identifying active codes in the ranging subchannel comprises decomposing an observation space into a signal subspace and a noise subspace.

4. The method of claim 3, wherein the step of identifying active codes in the ranging subchannel further comprises identifying active codes by applying a multiple signal classification algorithm to the signal subspace and the noise subspace.

5. The method of claim 1, wherein the step of estimating carrier frequency offsets further comprises estimating carrier frequency offsets by applying a multiple signal classification (MUSIC) algorithm to a signal subspace and a noise subspace.

6. The method of claim 1, wherein the step of estimating timing delays further comprises applying a maximum likelihood (ML) estimation algorithm to the ranging subchannel to produce an ML estimation vector.

7. The method of claim 6, wherein the step of estimating timing delays further comprises applying a least-squares estimation algorithm to the ML estimation vector to estimate timing delays.

8. The method of claim 1, wherein the step of estimating power levels comprises applying a least-squares estimation algorithm to a maximum likelihood (ML) estimation vector to estimate power levels.

9. The method of claim 1, wherein the step of estimating timing delays further comprises applying a simplified ML estimation algorithm having reduced computational complexity to the model to produce an ML estimation vector.

10. The method of claim 9, wherein the step of estimating timing delays further comprises applying a simplified least-squares estimation algorithm having reduced computational complexity to the ML estimation vector to estimate timing delays.

11. The method of claim 1, wherein the step of estimating power levels comprises applying a simplified least-squares estimation algorithm having reduced computational complexity to a maximum likelihood (ML) estimation vector to estimate power levels.

12. The method of claim 1, further comprising the step of processing all subcarriers and subchannels of the plurality of blocks to provide updated estimates of carrier frequency offsets, timing delays, and power levels for the plurality of remote user devices.

13. The method of claim 1, wherein the step of estimating carrier frequency offsets further comprises estimating carrier frequency offsets using an Estimation of Signal Parameters via Rotational Invariance Techniques (ESPRIT) algorithm.

14. A system for initial ranging in a wireless communication system, comprising:
an orthogonal frequency division multiple access (OFDMA) transceiver for receiving a plurality of blocks from a plurality of remote user devices in wireless communication with the OFDMA receiver;
an active code identification module programmed into the OFDMA transceiver for identifying active codes in a ranging subchannel of the plurality of; blocks, the active code identification module calculating a total number of active codes in the ranging subchannel by computing a correlation matrix and applying an eigendecomposition procedure to the correlation matrix, and using a minimum description length algorithm;
a carrier frequency offset estimation module for estimating carrier frequency offsets for all active devices of the plurality of remote user devices in a first processing step using the active codes;
a timing delay estimation module for estimating timing delays for all active devices of the plurality of remote user devices in a second processing step using the active codes; and
a power level estimation module for estimating power levels for all active devices of the plurality of remote user devices in a third processing step using the active codes,
wherein the OFDMA transceiver broadcasts the estimated carrier frequency offsets, timing delays, and power levels to the plurality of remote user devices so that the plurality of remote user devices can adjust transmission parameters in response to the broadcasted estimates to synchronize communication with the base station OFDMA transceiver.

15. The system of claim 14, wherein the modules process all subcarriers and subchannels of the plurality of blocks to provide updated estimates of carrier frequency offsets, timing delays, and power levels for the plurality of remote user devices, and the OFDMA transceiver broadcasts the updated estimates to the plurality of remote user devices.

16. A non-transitory computer-readable medium having computer-executable instructions for performing a method comprising the steps of:
extracting a ranging subchannel from a plurality of blocks received by a base station from a plurality of remote user devices in wireless communication with the base station;
calculating a total number of active codes in the ranging subchannel by determining a total number of received codes by creating a correlation matrix and applying an eigendecomposition procedure to the correlation matrix, and by applying a minimum description length algorithm to the received codes to calculate the total number of active codes;
estimating carrier frequency offsets for all active devices of the plurality of remote user devices in a first processing step using the active codes;
estimating timing delays for all active devices of the plurality of remote user devices in a second processing step using the active codes;
estimating power levels for all active devices of the plurality of remote user devices in a third processing step using the active codes; and
instructing the base station to broadcast the estimated carrier frequency offsets, timing delays, and power levels to the plurality of remote user devices, wherein the plurality of remote user device adjust transmission parameters in response to the broadcasted estimates to synchronize communication with the base station.

17. The computer-readable medium of claim 16, wherein the step of identifying active codes in the ranging subchannel comprises decomposing received codes in the ranging subchannel into a signal subspace and a noise subspace.

18. The computer-readable medium of claim 17, wherein the step of identifying active codes in the ranging subchannel further comprises identifying active codes by applying a multiple signal classification algorithm to the signal subspace and the noise subspace.

19. The computer-readable medium of claim 16, wherein the step of estimating carrier frequency offsets further comprises estimating carrier frequency offsets by applying a multiple signal classification algorithm to a signal subspace and a noise subspace.

20. The computer-readable medium of claim 16, wherein the step of estimating timing delays further comprises applying a maximum likelihood (ML) estimation algorithm to the ranging subchannel to produce an ML estimation vector.

21. The computer-readable medium of claim 20, wherein the step of estimating timing delays further comprises applying a least-squares estimation algorithm to the ML estimation vector to estimate timing delays.

22. The computer-readable medium of claim 16, wherein the step of estimating power levels comprises applying a least-squares estimation algorithm to a maximum likelihood (ML) estimation vector to estimate power levels.

23. The computer-readable medium of claim 16, wherein the step of estimating timing delays further comprises applying a simplified maximum likelihood (ML) estimation algorithm having reduced computational complexity to the model to produce an ML estimation vector.

24. The computer-readable medium of claim 23, wherein the step of estimating timing delays further comprises applying a simplified least-squares estimation algorithm having reduced computational complexity to the ML estimation vector to estimate timing delays.

25. The computer-readable medium of claim 16, wherein the step of estimating power levels comprises applying a simplified least-squares estimation algorithm having reduced computational complexity to a maximum likelihood (ML) estimation vector to estimate power levels.

26. The computer-readable medium of claim 16, further comprising the step of processing all subcarriers and subchannels of the plurality of blocks to provide updated estimates of carrier frequency offsets, timing delays, and power levels for the plurality of remote user devices.

27. The computer-readable medium of claim 16, wherein the step of estimating carrier frequency offsets further comprises estimating carrier frequency offsets using an Estimation of Signal Parameters via Rotational Invariance Techniques (ESPRIT) algorithm.

* * * * *

UNITED STATES PATENT AND TRADEMARK OFFICE
CERTIFICATE OF CORRECTION

PATENT NO. : 8,254,242 B2  
APPLICATION NO. : 12/114220  
DATED : August 28, 2012  
INVENTOR(S) : Michele Morelli et al.

Page 1 of 7

It is certified that error appears in the above-identified patent and that said Letters Patent is hereby corrected as shown below:

Column 4, line 17, "$\leqq$" should be replaced with --$\leq$-- both instances

Column 4, line 25, "$v=1 \;^{V-1}$" should be replaced with -- $\sum_{v=0}^{V-1}$ --

Column 4, line 60, "$\leqq$" should be replaced with --$\leq$--

Column 5, line 29, replace "$F_{Q-1}{}^H]^H$" with -- $F_{Q-1}^H]^H$ --

Column 5, line 50, replace equation (7) with -- $H_k(i_{q,v}) = \sum_{\ell=0}^{L-1} h_k(\ell) e^{-j\frac{2\pi\ell}{N} i_{q,v}}$ --

Column 6, line 36, "$\leqq$" should be replaced with --$\leq$--

Column 6, line 44, "$\geqq$" should be replaced with --$\geq$--

Column 7, line 5, replace equation (9) with -- $Y_m \approx \sum_{k=1}^{K} c_k(m) e^{jm\omega_k N_T} S_k(\theta_k) + n_m$ --

Column 7, line 33, replace the equation after "codes" with -- $\{\Gamma(\omega_k) c_k\}_{k=1}^{K}$ --

Column 7, lines 35-36, replace the equation after "amplitudes" with -- $\{S_k(\theta_k, i_{q,v})\}_{k=1}^{K}$ --

Column 7, line 43, "$\geqq$" should be replaced with --$\geq$--

Signed and Sealed this  
Twelfth Day of February, 2013

Teresa Stanek Rea  
*Acting Director of the United States Patent and Trademark Office*

CERTIFICATE OF CORRECTION (continued)
U.S. Pat. No. 8,254,242 B2

Column 7, line 44, "$\geqq$" should be replaced with --$\geq$--, both occurrences Column 8, line 18, the equation after "eigenvalues" should be replaced with -- $\hat{\lambda}_1 \geq \hat{\lambda}_2 \geq \cdots \geq \hat{\lambda}_M$ --

Column 8, line 55, the equation after "codes" should be replaced with -- $\{\Gamma(\omega_k)\mathbf{c}_k\}_{k=1}^{K}$ --

Column 8, line 61, the equation after "eigenvalues" should be replaced with -- $\hat{\lambda}_1 \geq \hat{\lambda}_2 \geq \cdots \geq \hat{\lambda}_M$ --

Column 9, lines 20-21, the equation after "set" should be replaced with

-- $\{\Psi_k(\hat{\omega}_k)\}_{k=1}^{M-1}$, say $\{\Psi_{u_k}(\hat{\omega}_{u_k})\}_{k=1}^{K}$ --

Column 9, line 32, "$\leqq$" should be replaced with --$\leq$--, both occurrences Column 9, line 35, the equation preceding "is guaranteed" should be replaced with -- $\{\Gamma(\omega_k)\mathbf{c}_k\}_{k=1}^{K}$ --

Column 9, line 64, the equation after "indices" should be replaced with -- $\{u_k\}_{k=1}^{K}$ --

Column 10, line 3, "2" should be deleted

Column 10, line 14, the equation after "vectors" should be replaced with -- $\{\mathbf{Y}_m\}_{m=0}^{M-1}$ --

Column 10, lines 38-39, the equation after "segments" should be replaced with -- $\{\hat{\mathbf{S}}_k(\theta_k, i_q)\}_{q=0}^{Q-1}$ --

Column 10, line 47, equation (25) should be replaced with

-- $\hat{S}_k(i_{q,\nu}) = e^{-j\frac{2\pi\theta_k}{N}i_{q,\nu}} \sum_{\ell=0}^{L-1} h_k(\ell) e^{-j\frac{2\pi n}{N}i_{q,\nu}} + \xi_k(i_{q,\nu})$ --

Column 10, line 51, the equation preceding "are" should be replaced with -- $\{\hat{\mathbf{S}}_k(\theta_k, i_{q,\nu})\}_{q=0}^{Q-1}$ --

Column 10, line 52, "$\leqq$" should be replaced with --$\leq$--, both occurrences Column 10, line 62, equation (27) should be replaced with -- $[\mathbf{F}(\nu)]_{q,\ell} = e^{-j\frac{2\pi}{N}\ell i_{q,\nu}}$, $0 \leq q \leq Q-1$ and $0 \leq \ell \leq L-1$ --

CERTIFICATE OF CORRECTION (continued)
U.S. Pat. No. 8,254,242 B2

Column 11, line 19, "≦" should be replaced with --≤--

Column 11, line 38, equation (32) should be replaced with -- $\Upsilon_k(\tilde{\theta}_k) = \sum_{\ell=\tilde{\theta}_k}^{\tilde{\theta}_k+L-1} \left| \sum_{v=0}^{V-1} \hat{s}_k(v,\ell) e^{j\frac{2\pi\ell}{N}v} \right|^2$ --

Column 11, line 43, "(v,I)" should be replaced with --$(v,\ell)$--

Column 11, line 44, the equation after "sequence" should be replaced with -- $\{\hat{S}_k(i_{q,v})\}_{q=0}^{Q-1}$ --

Column 11, line 47, equation (33), replace with -- $\hat{s}_k(v,\ell) = \sum_{q=0}^{Q-1} \hat{S}_k(i_{q,v}) e^{j\frac{2\pi\ell}{Q}q}$ --

Column 11, line 57, equation (34), replace with -- $\Upsilon_k(\tilde{\theta}_k) = \sum_{\ell=\tilde{\theta}_k}^{\tilde{\theta}_k+L-1} |\hat{s}_k(0,\ell)|^2$ --

Column 12, line 26, replace the equation after "sequence" with -- $\{\hat{s}_k(v,\ell)\}_{\ell=0}^{Q-1}$ --

Column 12, line 26, "≦" should be replaced with --≤--

Column 12, line 35, equation after "vector" should be replaced with -- $\sum_{m=0}^{M-1} \mathbf{D}_m^H(\hat{\omega})\mathbf{Y}_m$ --

Column 13, line 23, equation before "are" should be replaced with -- $\{\hat{S}_k(i_{q,v})\}_{k=1}^{K}$ --

Column 13, line 41, "≦" should be replaced with --≤--, all four occurrences

Column 13, line 44, equation (43) should be replaced with -- $\Upsilon_k^{(1)}(\tilde{\theta}_k) = \sum_{\ell=\tilde{\theta}_k}^{\tilde{\theta}_k+L-1} \sum_{v=0}^{V-1} |\hat{s}_k(v,\ell)|^2$ --

Column 14, line 3, equation (44) should be replaced with

-- $\Upsilon_k^{(2)}(\tilde{\beta}_k, \tilde{p}_k) = 2\text{Re}\left\{ \sum_{\ell=\tilde{\beta}_k}^{\tilde{\beta}_k+L-1} \sum_{v=0}^{V-2} \sum_{n=1}^{V-v-1} \hat{s}_k(v,\ell) \hat{s}_k^*(v+n,\ell) e^{-j\frac{2\pi n}{N}(\ell+\tilde{p}_k Q)} \right\}$ --

Column 14, line 34, the equation after quantities should be replaced with -- $\{\hat{s}_k(v,\ell)\}_{\ell=0}^{Q-1}$ --

Column 14, line 35, "≦" should be replaced with --≤--, both occurrences

CERTIFICATE OF CORRECTION (continued)
U.S. Pat. No. 8,254,242 B2

Column 14, line 54, equation (47) should be replaced with $$\varphi_k = \arg\left\{\sum_{\ell=\bar{\beta}_k}^{\bar{\beta}_k+L-1} \hat{s}_k(0,\ell)\hat{s}_k^*(1,\ell)e^{-j\frac{2\pi\ell}{N}}\right\}$$

Column 15, line 53, equation (49) should be replaced with $$E\left\{|h_k(\ell)|^2\right\} = \sigma_{h,k}^2 \exp(-\ell/12), \quad \ell = 0,1,\ldots,11$$

Column 15, line 55, replace "$\sigma_{h,k}{}^2$" with -- $\sigma_{h,k}^2$ --

Column 15, line 56, replace "$\sigma_{h,k}{}^2$" with -- $\sigma_{h,k}^2$ --

Column 15, line 57, "≦" should be replaced with --≤--, both occurrences

Column 15, line 57, the equation after "powers" should be replaced with -- $\{P_k\}_{k=1}^{K}$ --

Column 16, line 1, "≦" should be replaced with --≤--

Column 16, line 39, "≦" should be replaced with --≤--

Column 16, line 57, "ELM" should be replaced with --FLM--

Column 17, lines 27-28, replace the equation with -- $J_q^{(r)} = \{i_q^{(r)} + v\}_{v=0}^{V-1}$ --

Column 17, line 28, "$i_q^{(r)}$" should be replaced with -- $i_q^{(r)}$ --

Column 17, line 30, "$i_q^{(r)}$" should be replaced with -- $i_q^{(r)}$ --

Column 17, line 31, the equation after "i.e.," should be replaced with -- $J^{(r)} = \bigcup_{q=0}^{Q-1} J_q^{(r)}$, --

Column 17, line 33, the equation after "set" should be replaced with

-- $J_{q_1}^{(r_1)} \cap J_{q_2}^{(r_2)} = \varnothing$ for $q_1 \neq q_2$ or $r_1 \neq r_2$ --

Column 17, line 33, "$N_R$=QVR" should be --$N_R$ = QVR--

Column 17, line 53, "≦" should be replaced with --≤--

Column 18, line 2, "$\geqq$" should be replaced with --$\geq$--

Column 18, line 29, "C$_{lk}$" should be replaced with -- $C_{\ell_k}$ --

Column 18, line 41, the equation should be replaced with -- $H'_k(n) = \sum_{\ell=0}^{L-1} h'_k(\ell) e^{-j2\pi n\ell/N}$ --

Column 18, line 57, delete the remainder of the sentence after the word "variance" and replace with -- $\sigma_w^2 = \sigma_n^2 + \sigma_{ICI}^2$, where $\sigma_n^2$ and $\sigma_{ICI}^2$ --

Column 19, line 2, replace the equation with -- $\{H'_k(i_q + v)\}_{v=0}^{V-1}$ --

Column 19, line 19, delete the equation after "where" and replace with -- $S_k(q) = \gamma_N(\varepsilon_k)\bar{H}'_k(q)e^{-j2\pi i_q \theta_k/N}$ --

Column 19, line 49, delete the equation and replace with -- $\sigma_w^2 \mathbf{I}_M$ --

Column 20, line 7, "$\geqq$" should be replaced with --$\geq$--

Column 20, line 8, "$\geqq$" should be replaced with --$\geq$--, both occurrences Column 20, line 19, delete the equation and replace with -- $\{\hat{\lambda}_{\hat{K}+1}, \hat{\lambda}_{\hat{K}+2}, \ldots, \hat{\lambda}_M\}$ --

Column 20, line 24, "$\geqq$" should be replaced with --$\geq$--

Column 20, line 25 "$\geqq$" should be replaced with --$\geq$--, both occurrences Column 20, line 44, "C$_{lk}$" should be replaced with -- $C_{\ell_k}$ --

Column 20, line 50, the equation should be replaced with -- $\{J_{l_k}\}_{k=1}^{K}$ --

Column 20, line 53, the equation should be replaced with -- $(\ell_k, \varepsilon_k)$ --

Column 20, line 64, " $\hat{I}_k$ " should be -- $\hat{\ell}_k$ --

CERTIFICATE OF CORRECTION (continued)
U.S. Pat. No. 8,254,242 B2

Column 20, line 65, "$l_k$" should be -- $\ell_k$ --

Column 20, line 66, "$l_k$" should be -- $\ell_k$ --

Column 20, line 67, equation (67) should be replaced with -- $\hat{\ell}_k^{(F)} = [\hat{\ell}_k]_{M-1}$ --

Column 21, line 53, the equation should be replaced with -- $\{\hat{\eta}_k\}_{k=1}^{K}$ --

Column 21, line 54, the equation should be replaced with -- $(\hat{\ell}_k, \hat{\theta}_k)$ --

Column 21, line 56, "≦" should be replaced with --≤--, both occurrences

Column 21, line 58, the equation after "range" should be -- $I_{\ell_k} = [\ell_k - \alpha; \ell_k + \alpha]$ --

Column 21, line 59, the equation should be replaced with -- $\{I_{\ell_k}\}_{k=1}^{K}$ --

Column 21, line 60, the equation should be replaced with -- $(\ell_k, \theta_k)$ --

Column 22, line 6, "$l_k$" should be replaced with -- $\ell_k$ --

Column 22, line 7, equation (74) should be replaced with -- $\hat{\ell}_k^{(f)} = [\hat{\ell}_k]_{V-1}$ --

Column 22, line 14, "$\hat{I}_k^{(F)}$ and $\hat{I}_k^{(f)}$" should be replaced with -- $\hat{\ell}_k^{(F)}$ and $\hat{\ell}_k^{(f)}$ --

Column 22, line 15, "$l_k$" should be replaced with -- $\ell_k$ --

Column 22, line 18, the remainder of the sentence after "sets" should be replaced with -- $I^{(f)} = \{\hat{\ell}_k^{(f)}\}_{k=1}^{K}$ and $I^{(F)} = \{\hat{\ell}_k^{(F)}\}_{k=1}^{K}$ --

Column 22, line 20, the equation preceding the word "Hence", should be replaced with -- $I^{(f)} = I^{(F)} = \{\ell_k\}_{k=1}^{K}$ --

Column 22, line 58, equation (79) should be replaced with

-- $\left[\mathbf{E}_m(\hat{\xi}, \hat{\eta})\right]_{v+1,k} = e^{j2\pi(m\xi_k + v\eta_k)} \quad 0 \leq v \leq V-1, \quad 1 \leq k \leq K$ --

CERTIFICATE OF CORRECTION (continued)

Column 22, line 65, the equation should be replaced with -- $\sigma^2_{\mu_k} = \sigma^2_w \left[ \mathbf{T}^{-1}(\hat{\xi}, \hat{\eta}) \right]_{k,k}$ --

Column 22, line 66, the equation after "given by" should be replaced with -- $|S_k(q)|^2 - \sigma^2_{\mu_k}$ --

Column 23, line 17, the equation should be replaced with -- $\hat{\sigma}^2_{\mu_k} = \hat{\sigma}^2_w \left[ \mathbf{T}^{-1}(\hat{\xi}, \hat{\eta}) \right]_{k,k}$ and $\hat{\sigma}^2_w$ --

Column 23, lines 47-48, the equation should be replaced with

-- $E\{|h_k(l)|^2\} = \sigma^2_h \times exp(-l/12)$ for $l = 0, 1, \ldots, 11$, where $\sigma^2_h$ --

Column 23, line 56, "≦" should be replaced with --≤--